United States Patent
Abo et al.

(10) Patent No.: US 6,745,743 B2
(45) Date of Patent: Jun. 8, 2004

(54) CONTROL APPARATUS FOR A DIRECT INJECTION ENGINE

(75) Inventors: Matsuharu Abo, Inakadate (JP); Koji Onishi, Hitachinaka (JP); Hiroshi Fujii, Tokyo (JP); Mamoru Fujieda, Tomobe (JP); Junichi Yamaguchi, Tokai (JP); Yoshiyuki Tanabe, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/245,725

(22) Filed: Sep. 18, 2002

(65) Prior Publication Data

US 2003/0121495 A1 Jul. 3, 2003

(30) Foreign Application Priority Data

Dec. 27, 2001 (JP) ........................................ 2001-395830

(51) Int. Cl.$^7$ ................................................. F02B 17/00
(52) U.S. Cl. ........................................ 123/295; 123/305
(58) Field of Search ................................ 123/305, 294, 123/295, 436, 434, 445

(56) References Cited

U.S. PATENT DOCUMENTS 6,539,916 B2 * 4/2003 Ueda et al. .................. 123/295

FOREIGN PATENT DOCUMENTS

JP 9-303189 11/1997

* cited by examiner

Primary Examiner—Bibhu Mohanty
(74) Attorney, Agent, or Firm—Crowell & Moring LLP

(57) ABSTRACT

A control apparatus for a direct injection engine having an intake valve, an exhaust valve and a fuel injection valve for injecting fuel directly into a cylinder of the engine and in which fuel injection by the fuel injection valve is performed during intake stroke or during compression stroke of the engine, has combustion stabilizing device for stabilizing combustion in the cylinder. The combustion stabilizing device has next operation mode determination device for selecting either an operation mode of recovering the combustion stability by fuel injection during intake stroke or an operation mode of recovering the combustion stability by fuel injection during compression stroke when a deteriorated state of combustion is detected in fuel injection during compression stroke.

20 Claims, 22 Drawing Sheets

CONTROL APPARATUS FOR A DIRECT INJECTION ENGINE

BACKGROUND OF THE INVENTION

The present invention relates to a control apparatus for a direct injection engine, and particularly to a control apparatus for a direct injection engine to recover from deterioration of combustion in the compression stroke injection mode by a fuel injection valve.

For automobiles of the present time, there is a growing demand for reduction of exhaust emissions such as carbon mono oxide (CO), hydro carbons (HC), nitrogen oxides (NOx) contained in automobile emissions in view of environmental protection. One approach for reducing such emissions is a direct injection engine (in-cylinder injection type internal combustion engine). In the direct injection engine, fuel is injected through a fuel injection valve directly into the combustion chamber of a cylinder.

Fuel injection by the fuel injection valve is generally performed during intake stroke or the compression stroke of the engine. For example, when a high load and a high rotational speed are required, fuel is injected during intake stroke to effect homogeneous combustion at a stoichiometric mixture thereby stabilizing the combustion, and at the same time, when a light load and a low rotational speed are required, fuel is injected during compression stroke to effect stratified combustion at a lean mixture thereby improving the fuel consumption rate (fuel economy).

In a direct injection engine, as described above, fuel injection is performed either during intake stroke or the compression stroke depending on the operational demands. However, in the fuel injection during compression stroke, there is a problem in that combustion tends to be deteriorated due to incomplete mixing of air and fuel. To solve this problem, a direct injection engine technique having means for recovering combustion stability has been proposed (see JP-A-9-303189 for example).

The proposed technique has combustion quality recovery means, which switches the operational mode from fuel injection during compression stroke to fuel injection during intake stroke immediately after deterioration of combustion is detected during fuel injection of the compression stroke.

The above described combustion quality recovery means has a function to recover the combustion stability by changing the control parameters such air-fuel ratio, fuel injection timing, and injection timing when deterioration of combustion is detected during fuel injection of the compression stroke. Moreover, the combustion quality recovery means has also a function to perform fuel injection forcibly, so to speak, during intake stroke regardless of the detection of deterioration of combustion, thereby preventing the deterioration of combustion due to the deposits produced by the fuel injection during compression stroke when fuel injection during compression stroke has continued for a predetermined time period.

On one hand, fuel injection during compression stroke of the engine facilitate the stratification of air and fuel in the cylinder making it possible to burn the fuel concentrated around the spark plug. This will enable an operation at lean air-fuel ratio as the whole combustion chamber, and therefore would be advantageous in improving the fuel economy.

However, in the above described prior art, since the operation mode is immediately switched to fuel injection during intake stroke by terminating the fuel injection during compression stroke when deterioration of combustion is detected during fuel injection of the compression stroke, or fuel injection of the intake stroke is forcibly performed when fuel injection during compression stroke has continued longer than a preset time, there will be few drawbacks in view of combustion stability, but inconveniences would result in view of fuel consumption rate. Moreover, since switching to fuel injection during intake stroke as described above will cause a torque step at the moment of the switching, a problem arises in that the driver of the vehicle will perceive an unintended torque change as an uncomfortable feel or as a degraded drive feel.

Moreover, although the above described combustion quality recovery means according to the prior art discloses the points of switching to fuel injection during intake stroke and of changing the control parameters during fuel injection of the compression stroke, these points are described separately and independently, and there is no disclosure on the selection of these points and the priority in selecting either of them. In this prior art, there will be a problem, for example, of the buildup of deposits produced around the injection opening of the fuel injection valve. The deposits in early stages when the spray pattern of fuel starts changing can be removed by burning the deposits by fuel injection during intake stroke. However, when the amount of the deposits increases in later stages, they may not be thoroughly removed. It is considered that this phenomena will frequently occur as a factor of deterioration of combustion, and that when switching to fuel injection is performed during intake stroke, or control parameters are changed in fuel injection during compression stroke independently without a proper selection, the above described stage of deposit buildup will not be taken into account, and therefore deterioration of combustion due to the buildup of deposits will not be properly addressed.

Moreover, in the above described prior art, no consideration is given to the point that combustion stability may be enhanced by improving the mixing method of air and fuel which will affect the combustion stability.

In a direct injection engine in which fuel injection is performed during intake stroke or the compression stroke of the engine, when the spray pattern of the fuel injection valve changes due to aged deterioration, that will give an impact on the combustion stability in the case of fuel injection during compression stroke. Therefore, one approach to this problem would be switching to fuel injection during intake stroke to recover the combustion stability thereby preventing deterioration of combustion. However, such switching of fuel injection will cause a torque step giving a shock to the driver thus degrading the driving feel.

The present invention has been achieved in view of the above described problems, and its object is to provide a control apparatus for a direct injection engine, wherein deterioration of combustion due to fuel injection during compression stroke of the engine will be prevented thereby enhancing the driving feel, and fuel consumption rate will be improved by expanding the driving range by fuel injection during compression stroke.

SUMMARY OF THE INVENTION

To attain the above described object, the present invention provides a control apparatus for a direct injection engine, in which a fuel injection valve for injecting fuel directly into the cylinder is provided, and fuel injection by the fuel injection valve is performed at least during intake stroke or during compression stroke of the engine, characterized in that the control apparatus comprises combustion stabilizing means for stabilizing combustion in the cylinder, and the combustion stabilizing means comprises next operation mode determination means for enabling the selection of the operation mode for recovering combustion stability either by fuel injection during intake stroke or by fuel injection during compression stoke when a deteriorated state of combustion is detected during fuel injection of the compression stroke.

In the control apparatus for a direct injection engine configured as describe above according to the present invention, the next operation mode determination means of the combustion stabilizing means includes an operation mode for recovering combustion stability by fuel injection during intake stroke, and an operating mode for recovering combustion stability by fuel injection during compression stroke, and when a deteriorated state of combustion is detected during fuel injection of the compression stroke, either of the operation mode by the intake stroke injection or by the compression stroke injection is selected, and therefore it is possible to decrease the operation mode by the intake stroke injection and expand the operation range by fuel injection during compression stroke further than the conventional approaches. And, owing to the above described configuration, switching to fuel injection during intake stroke can be performed in response to various demands such as acceleration demand and deceleration demand from the driver or an automatic car-to-car distance control system, thus making it possible to address both problems: combustion deterioration due to deposits and degradation of driving feel due to a torque shock.

The combustion stabilizing means comprises intake stroke injection continuation means for continuing fuel injection during intake stroke for a predetermined time period when recovering the combustion stability by fuel injection during intake stroke. Alternately, the above described combustion stabilizing means comprises control parameter change means for changing the control parameters relating to the combustion when recovering combustion stability by fuel injection during compression stroke. The control parameters comprises at least one of a fuel pressure, an amount of emission gas recirculation, an opening degree of an airflow generation valve, an amount of valve-overlap of the intake and exhaust valves, and the number of fuel injection.

The next operation mode determination means selects the operation mode for recovering combustion stability by fuel injection during intake stroke in response to the number of detection of deteriorated combustion state during fuel injection of the compression stroke or the operational demands of the engine.

Alternatively, the next operation mode determination means inhibits the switching to the operation mode for recovering combustion stability by fuel injection during compression stroke when recovering combustion stability by fuel injection during intake stroke, and selects the operation mode for recovering combustion stability by fuel injection during compression stroke when continuation of the operation mode of recovering combustion stability by fuel injection during intake stroke has been performed a predetermined number of times.

The combustion stabilizing means comprises control parameter changing means for changing the control parameters relating to combustion when recovering combustion stability by fuel injection during compression stroke, and the control parameter includes at least one of fuel injection timing of the fuel injection valve, an amount of target injection, and the ignition timing.

The control parameters of fuel injection timing and the ignition timing are alternately changed.

The control parameters of fuel injection timing and the ignition timing are changed by either being advanced of retarded so that the fuel injection timing and the ignition timing respectively provide substantially equal amounts of crankshaft angle change with respect to a reference crankshaft angle at which the fuel injection timing and the ignition timing are on the same crank angle.

The combustion stabilizing means also comprises control parameter resetting means, which when a deteriorated state of combustion during fuel injection of the compression stroke is improved, resets the control parameters to the values at the time of the improvement, and stores the reset values until next deteriorated state of combustion during fuel injection on the following compression stroke is detected.

The combustion stabilizing means comprises rotational fluctuation determination means for determining the combustion state on the basis of the fluctuation of rotation of the engine.

The control apparatus has the operational region of fuel injection during compression stroke as a control map of the rotational speed and the load of the engine, or as a control map based on the rotational speed of the engine and the water temperature, and when fluctuation of rotation of the engine exceeds a predetermined threshold, the combustion stabilizing means changes those sections of the control map having exceeded the threshold from the operational region of fuel injection during compression stroke to the operational region of fuel injection during intake stroke.

The engine is equipped with a supercharger and the combustion stabilizing means limits supercharge pressure of the supercharger below a predetermined value or lower the supercharge pressure of the supercharger when the fluctuation of rotation of the engine exceeds a predetermined threshold.

The engine comprises a inner EGR mechanism for introducing the combustion gas into the cylinder by increasing or decreasing an amount of valve overlap of the intake/exhaust valves, and an outer EGR mechanism for introducing combusted gas into an intake port from other pipe path, and the combustion stabilizing means reduces an amount of the outer EGR and/or increases an amount of the inner EGR when the fluctuation of rotation of the engine exceeds a predetermined threshold.

With the engine being combined with an automatic transmission, the combustion stabilizing means comprises transmission cooperative control means which disengages lock-up of the automatic transmission when the fluctuation of rotation of the engine exceeds a predetermined threshold, and reactivate the lock-up when the fluctuation of rotation of the engine becomes lower than the predetermined threshold in a substantially same range of the rotational speed at the time of disengagement of the lock-up after the disengagement of the lock-up.

Other objects, features and advantages of the invention will become apparent from the following description of the embodiments of the invention taken in conjunction with the accompanying drawings.

PREFERRED EMBODIMENTS OF THE INVENTION

Figure 1:
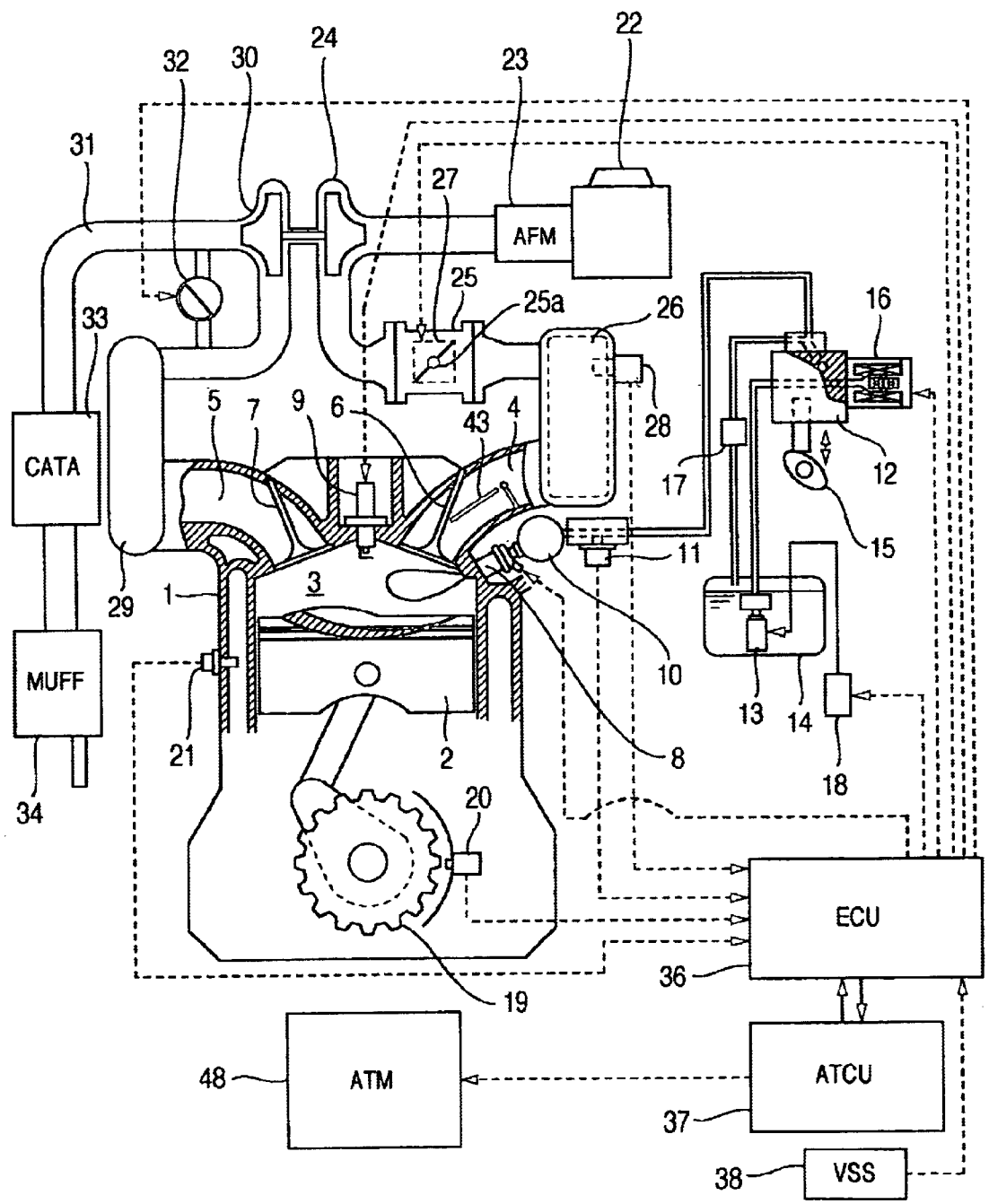
FIG. 1 is a schematic view of a turbo-charged direct injection engine equipped with a control apparatus for a direct injection engine according to the present invention, and its automatic transmission.

The embodiments of the present invention will be described referring to the drawings.

Figure 2:
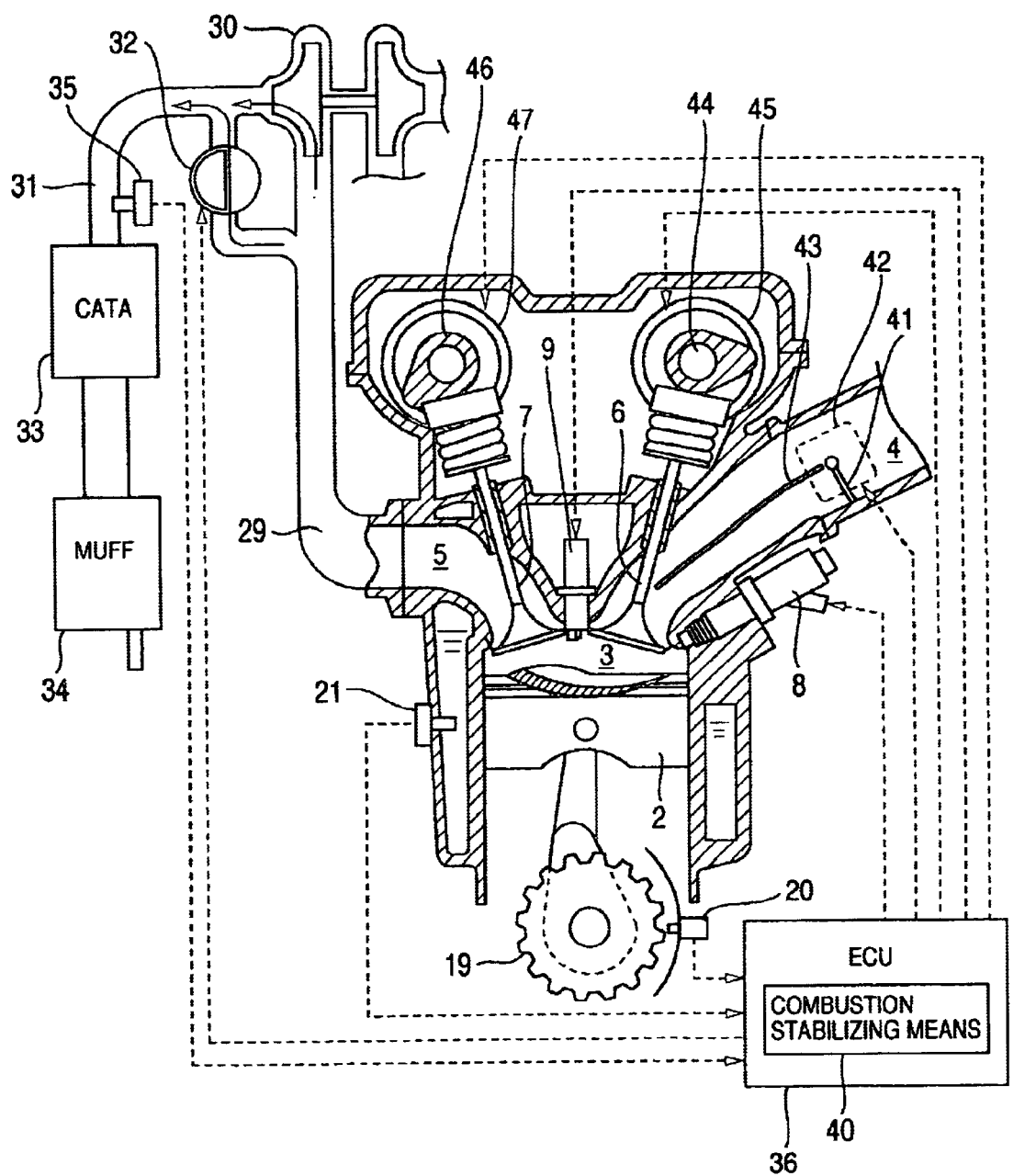
FIG. 2 is a schematic view of a variable valve train mechanism and an airflow generation mechanism of the engine shown in FIG. 1.

FIG. 1 and FIG. 2 show a turbo-charged direct injection engine equipped with a control apparatus for a direct injection engine according to the present invention. FIG. 1 is a schematic view of the engine and an automatic transmission, and FIG. 2 is a schematic view of a variable valve train mechanism and an airflow generation mechanism of the engine.

First, an overall configuration of the engine will be described referring to FIG. 1.

The engine is a direct injection engine with a turbocharger, and a body of the engine comprises a cylinder head and a cylinder block. The cylinder block is provided with a plurality of cylinders 1 having a combustion chamber 3 formed by a piston 2 inserted into the cylinder block.

The combustion chamber 3 is connected with an intake port 4 and an exhaust port 5 via an intake valve 6 and an exhaust valve 7. The intake port 4 is connected to an intake pipe 26, and there are arranged on the intake pipe 26 with, in positional order from upstream, an air cleaner 22, an airflow sensor 23, a compressor for turbocharger 24, and a motor-driven electronically controlled throttle body 25. A throttle valve 25a of the electronically controlled throttle body 25 is provided with a throttle sensor 27 for detecting opening degree of the throttle valve, and the intake pipe 26 is provided with a pressure sensor 28 for measuring the pressure in an intake air passage.

Also, the cylinder 1 is provided with a fuel injection valve 8 at a suitable position to inject fuel directly into the combustion chamber 3, and the fuel injection valve 8 is connected in its upstream with a fuel distribution pipe 10, a fuel pressure sensor 11, a high-pressure pump 12 for pumping the fuel at a high pressure, a low-pressure pump 13, and a fuel tank 14 respectively so as to inject fuel even in a high pressure state of the combustion chamber 3.

The high-pressure pump 12 is driven by a cam 15 operationally associated with a camshaft (not shown) of the engine to raise the fuel pressure, and the fuel with its pressure controlled to a predetermined fuel pressure by a high-pressure regulator 16 is supplied to the fuel distribution pipe 10. Also residual fuel, which is not consumed in the engine, is decompressed through a low-pressure regulator 17 and returned to the fuel tank 14.

The low-pressure pump 13 is driven by a low-pressure pump relay 18 from the moment when an engine key is set on for starting, and starts pressurizing fuel to be delivered to the high-pressure pump 12 in preparation for subsequent fuel injection.

A crankcase of the engine is provided with a rotational speed sensor 20 at a suitable position for detecting fluctuation of rotation of a ring gear 19 which rotates in synchronous with a crankshaft of the engine. Also a water temperature sensor 21 for determining a warming-up condition of the engine is provided at a suitable position in a water passage of the cylinder block.

The exhaust port 5 is connected to an exhaust manifold 29, and the exhaust manifold 29 is connected with an exhaust pipe 31 through a turbine 30 of the turbocharger. Specifically, the exhaust manifold 29 is connected to the exhaust pipe 31 by a bypass valve 32 bypassing the turbine 30 of the turbocharger so that an opening area of the bypass passage is varied by a rotary valve driven by a motor. In the downstream area of the exhaust pipe 31, a catalytic converter 33 and a silencer 34 are disposed. As shown in FIG. 2, the exhaust pipe 31 may be provided with an exhaust temperature sensor 35 at a suitable position between the bypass valve 32 and the catalytic converter 33.

The output signals from the various sensors such as the fuel pressure sensor 11, the rotational speed sensor 20, the water temperature sensor 21, the pressure sensor 28, and others are inputted to a control unit (ECU) 36. The ECU 36 determines whether or not a compression stroke injection mode is possible. Then, when the compression stroke injection mode is possible, the ECU 36 performs various programs programmed therein such as a fuel injection program, a fluctuation of rotation detection program, and a split injection control program to output drive signals to various actuators such as the fuel injection valve 8, a spark plug 9, the high-pressure regulator 16, the throttle valve 25a, the bypass valve 32, a variable driving part 45 for the intake valve, and a variable driving part 47 for the exhaust valve. The engine has a passage for exhaust gas recirculation (the outer EGR), of which configuration will be described later.

An automatic transmission control unit (ATCU) 37 performs a shift-up/down control, a lock-up control to directly engage a flywheel in the engine and a torque converter of the ATM 48, and the like for an automatic transmission (ATM) 48.

The ECU 36 and the ATCU 37 are interconnected by a communication line, and perform an optimum transmission control in response to condition of the engine and the automatic transmission.

Referring to FIG. 2, a tumble control valve (TCV) 41 which constitutes part of the airflow generation mechanism opens and closes a first step (a lower part of the division shown in FIG. 2) of a partition 43 dividing the intake port 4 into two parts, and the valve angle thereof is controlled based on an output signal from an airflow control means 53e which is provided in the combustion stability means 40 of the ECU 36 as will be described later. And the airflow control means 53e shown in FIG. 3 variably controls opening degree of the TCV 41 by driving a driving part 42 for the TCV with a motor or a diaphragm actuator to control strength of an air flow generated in the cylinder 1, that is, principally a tumble flow.

Next, an intake cam and an exhaust cam which constitute part of the variable valve train mechanism are rotated by an intake camshaft 44 and an exhaust camshaft 46 to variably control opening operation of the intake valve 6 and the exhaust valve 7. As will be described later, a variable valve train control means 53f provided in the combustion stabilizing means 40 of the ECU 36 drives the variable drive part 45 for the intake valve and the variable drive part 47 for the exhaust valve to control opening/closing timing of the valves thereby controlling airflow from the intake port 4 to the exhaust port 5. The variable drive parts 45, 47 will not be described in detail, but they are equipped with valve timing changing mechanisms such as a camshaft twisting, a cam head switching so that an operation angles of the cams can be changed.

The combustion stabilizing means 40 limits the super charge pressure of the supercharger to prevent deterioration of combustion by enhancing vaporization of the fuel spray in a pressurized cylinder, which will be describe later.

Figure 3:
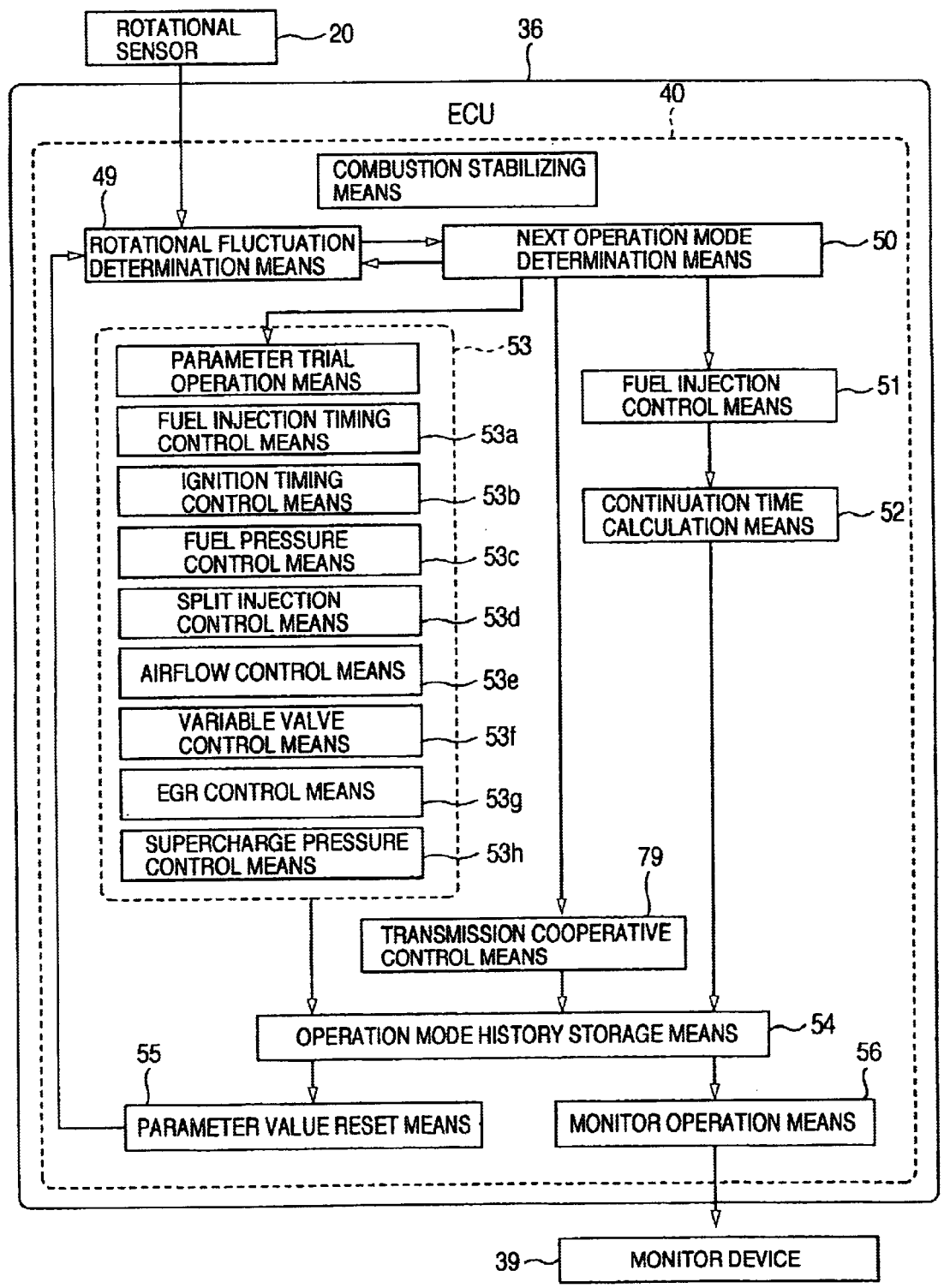
FIG. 3 is a control block diagram of the combustion stabilizing means within the control apparatus of the engine shown in FIG. 1.

Referring to FIG. 3, the combustion stabilizing means 40 changes the control parameters relating to combustion or continues the intake stroke injection mode to stabilize combustion in the cylinder 1 when recovering combustion stability by fuel injection during compression stroke. It comprises rotational fluctuation determination means 49, next operation mode determination means 50, fuel injection control means 51, continuation time calculation means 52 which is an aspect of an intake stroke injection continuation means, parameter trial operation means 53 which is an aspect of a control parameter change means, transmission cooperative control means 79, operation mode history storage means 54, parameter value reset means 55, and monitor operation means 56.

The rotational fluctuation determination means 49 is configured to acquire angular speed variation of the ring gear 19 detected by the rotational speed sensor 20 into the ECU 36 for calculation, and compares the result with a predetermined threshold of the fluctuation of rotation. It determines a combustion state based on the fluctuation of rotation and outputs the result to the next operation mode determination means 50.

When the rotational fluctuation determination means 49 determines that the threshold is surpassed in the fuel injection during compression stroke, that means detection of a deteriorated combustion state during fuel injection of the compression stroke. Therefore, the next operation mode determination means 50 selects at least either of the two modes: an operation mode for recovering combustion stability by changing the current and following injection mode to the intake stroke injection mode, or an operation mode for recovering combustion stability by changing the control parameters relating to combustion while continuing the compression stroke fuel injection mode, on the basis of the operation history of the injection mode theretofore. By this arrangement, it becomes possible to first perform, for example, the intake stroke injection mode, which is effective in quickly recovering from an early stage of deterioration of combustion, for predetermined number of times, and when combustion stability is not recovered yet, next perform the changing of control parameters in the compression stroke injection mode. Thus, it is made possible to rapidly cope with deterioration of combustion caused by various factors and, at the same time, reduce the number of switching of the injection mode and the frequency of repeating trial operations to change the control parameters in view of the overall recovering process thereby preventing the degradation of fuel economy.

The fuel injection control means 51 and the continuation time calculation means 52 are configured to perform recovery from deteriorated combustion due to the deposits, etc. in the intake stroke injection mode, and prohibit switching of the operation mode to the one which performs recovery of combustion stability by the fuel injection during compression stroke and continue the operation mode which performs recovery of combustion stability by fuel injection during intake stroke on the basis of the instruction by the next operation mode determination means 50. And, the results are outputted to the operation mode history storage means 54. For example, since an amount of the deposits is small in an early stage of deterioration of combustion, it is possible to switch to the intake stroke injection mode on the basis of the output signal of the rotational fluctuation determination means 49 to raise the combustion temperature thereby burning the deposits to rapidly recover the combustion stability. Thus it is possible to recover combustion stability without changing the set control parameters in an early stage of deterioration of combustion.

As another factor which contributes to combustion deterioration in the compression stroke injection mode, it is also considered that the spark plug 9 is smoke-covered which is resulted when the fuel spray injected by the fuel injection valve 8 reaches the spark plug 9 in a liquid droplet state without being sufficiently vaporized. Even in such a case, the combustion stabilizing means 40 of the present invention can recover combustion stability by continuing the intake stroke injection mode for a predetermined time period.

The parameter trial operation means 53 is configured to recover combustion stability in the compression stroke injection mode. In case where deterioration of combustion occurs successively, the means 53 changes the control parameters in trial in the compression stroke injection mode on the basis of the instruction by the next operation mode determination means 50 to prevent combustion deterioration from occurring successively thereafter as described later.

One of the factors causing combustion deterioration is considered to be the formation of deposits, as described above, which build up around an injection nozzle of the fuel injection valve or an injection opening in the combustion chamber. In such state that the deposits have built up, penetration capability of the fuel spray is degraded, or injection direction of the spray is shifted thereby changing the spray pattern. As a result, arrival time of the fuel spray to the spark plug 9 is varied, and the fuel spray timing and the ignition timing to achieve optimal combustion would change with respect to initial set values. It is known that the deposits can be removed by the operation in the intake stroke injection mode in which the combustion temperature is relatively high, but when the buildup grows further, it may not be thoroughly removed. Therefore, the parameter trial operation means 53 changes each control parameter such as the fuel injection timing and the ignition timing in the compression stroke injection mode when combustion deterioration has been detected consecutively.

More specifically, the parameter trial operation means 53 consists of fuel injection timing control means 53a, ignition timing control means 53b, fuel pressure control means 53c, split injection control means 53d, airflow control means 53e, variable valve control means 53f, EGR control means 53g, and supercharge pressure control means 53h. The means 53 performs changing of at least one control parameter of fuel injection timing, ignition timing, fuel pressure, number of fuel injection, opening degree of the airflow generation valve, valve overlap amount of the intake/exhaust valves, amount of exhaust gas recirculation, and target injection amount. For example, the airflow control means 53e achieves an optimum airflow singly or in combination with the variable valve control means 53f in response to the engine operating condition. The content of this change is output to the operation mode history storage means 54.

In case where combustion deterioration is detected in the compression stroke injection mode, the transmission cooperative control means 79 is configured to instruct the ATCU 37 to limit the lock-up control as far as an area of engine rotational speeds in which combustion deterioration has been detected. Even when combustion deterioration occurs, the ECU 36 and ATCU 37 cooperatively control to mitigate a surge torque to restrict the degradation of drivability. The results are output to the operation mode history storage means 54.

The operation mode history storage means 54 stores the number of executions of the operation mode for recovering combustion stability through the intake stroke fuel injection, and the change history of the control parameters which relates to the operation mode for recovering combustion stability through the compression stroke fuel injection to output them to the parameter reset means 55 and the monitor operation means 56. If combustion stability is not recovered even when continuation of the fuel injection during intake stroke has been performed more than a predetermined number of times, since the next operation mode determination means 50 permits switching to the operation mode for recovering combustion stability through the compression stroke fuel injection, a control routine for recovering the combustion stability will be configured in cooperation with the next operation mode determination means 50 without repeating surplus change of the control parameters in the compression stroke injection mode.

When a deteriorated state of combustion during compression stroke fuel injection is improved, the parameter value reset means 55 resets the control parameters to the values at the moment of the improvement, and stores the reset values until combustion deterioration during next fuel injection of the compression stroke is detected. By this arrangement, changes of the control parameters will not be repeatedly tried from the initially set values to the state of stabilized combustion, and upon entering the next compression stroke injection mode, immediately, operation can be performed with the control parameters which enable stable combustion. The results are output to the rotational fluctuation determination means 49.

The monitor operation means 56 instructs a monitor device 39 for check lamps of an automatic engine diagnostic apparatus, the instrument panel and the like to display the items which need maintenance or alert the driver for checking.

By the above described configuration, the combustion stabilizing mean 40 can control the fuel injection and the air flow to perform stable operation of the compression stroke injection mode.

Figure 4:
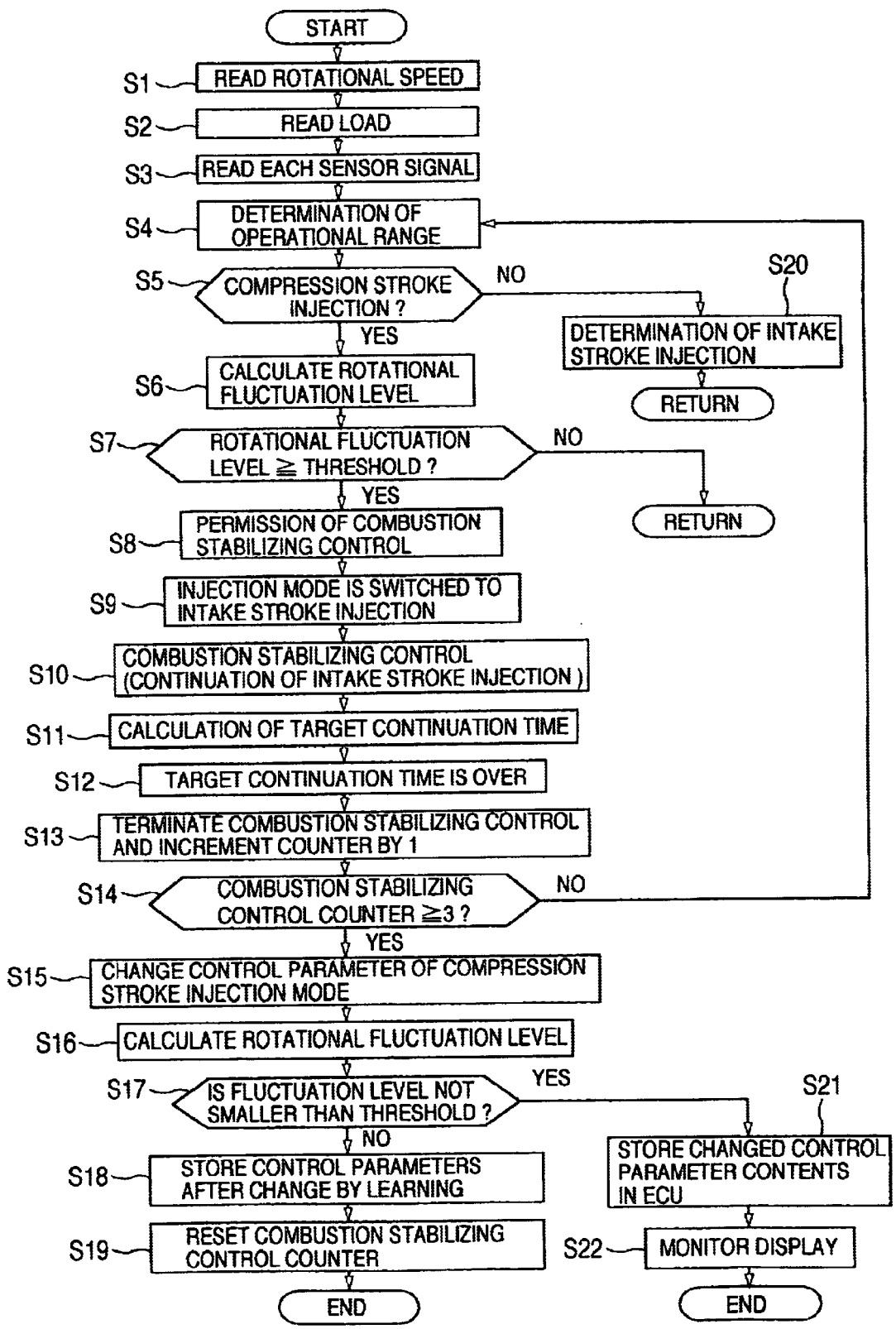
FIG. 4 is a flow chart to show the operation of the combustion stabilizing means of FIG. 3.

FIG. 4 is an operational flow chart of the combustion stabilizing means 40.

In step 1, the signal from the rotational speed sensor 20 is taken into. In step 2, engine load is taken into. In step 3, signals of other various sensors needed for engine control are taken into. Then, in step 4, a determination of operation area is made as to which operational mode is possible: the intake stroke injection mode by homogeneous combustion or the compression stroke injection mode by stratified combustion based on the various sensor signals.

In step 5, a determination is made as to whether or not the current mode is the compression stroke injection mode, and when it is determined to be the compression stroke injection mode, namely, 'YES', the process proceeds to step 6 and level of the fluctuation of rotational speed is calculated thereafter proceeding to step 7. On the other hand, when it is determined not to be the compression stroke injection mode in step 5, the process proceeds to step 20, in which it is determined that the current mode is the intake stroke injection mode, and thereafter the process exits the routine.

In step 7, it is determined whether or not combustion is deteriorated based on whether or not value of the rotational speed fluctuation level calculated by the rotational fluctuation determination means 49 has surpassed a predetermined threshold. When it is determined that combustion is deteriorated, or 'YES', the process proceeds to step 8 and when it is determined that combustion is not deteriorated, the process exits this routine.

In step 8, combustion stability control by the intake stroke injection mode is permitted by the next operation mode determination means 50 and the process proceeds to step 9. This is because the deposits are likely to be removed by the intake stroke injection mode when combustion deterioration is first detected, and because the combustion stabilizing control by the intake stroke injection mode can be performed when the effect of a torque shock during switching from the compression stroke injection mode to the intake stroke injection mode can be neglected as in the case in which the driver has depressed the acceleration pedal demanding an acceleration.

In step 9, switching timing to the intake stroke injection mode is determined and in step 10, operation by the intake stroke injection mode is performed with the fuel injection control means 51 and the continuation time calculation means 52. In step 11, the target time of the intake stroke injection mode is calculated. When the target continuation time has elapsed in step 12, the process proceeds to step 13. In step 13, combustion stabilizing control by the intake stroke injection mode is terminated and the combustion stabilizing control counter is increased by one as the number of executions of the intake stroke injection mode for recovering combustion stability. The process proceeds to step 14.

In step 14, a determination is made as to whether or not the combustion stabilizing control counter is not smaller than three, namely, whether or not the intake stroke injection mode for recovering combustion stability has been performed two times, and when the control counter is not less than three, namely, when 'YES,' the process proceeds to Step 15. Otherwise when the control counter is less than three, the process goes back to the determination of operation area in step 4.

In Step 15, since the recovery of combustion stability in the intake stroke injection mode is not sufficient, the combustion stabilizing control by the intake stroke injection mode is permitted by the next operation mode determination means 50, and the process proceeds to step 16 by changing each control parameter to recover combustion stability by the compression stroke injection mode and thereafter proceeds to step 17 after calculating the fluctuation level of rotation.

In step 17, whether or not combustion after changing the control parameters has been deteriorated is determined by the rotational fluctuation determination means 49 based on whether or not the calculated fluctuation level of rotation exceeds a predetermined threshold. When combustion has been deteriorated, namely, when 'YES,' the process proceeds to step 21, and otherwise when combustion has not been deteriorated, proceeds to step 18.

In step 18, since combustion stability has been recovered, the control parameters after change are written by the parameter value reset means 55 to the storage device in the ECU 36 as the control values to store them by learning. Subsequent operations in the compression stroke injection mode are performed on the basis of these reset control parameters. In step 19, the control counter of combustion stabilizing by the intake stroke injection mode in step 14 is reset to terminate a series of operations of combustion stabilization.

In step 21, on the other hand, the contents of the control parameter changed are stored by the operation mode history storage means 54, and the process proceeds to step 22 to make the monitor operation means 56 display the stored content on the monitor of the self-diagnostic apparatus. It is also possible to alert the driver by turning on the indicator lamp on the instrument panel.

Next, the combustion stabilizing control by the intake stroke injection mode will be described referring to FIGS. 5 to 8.

Figure 5:
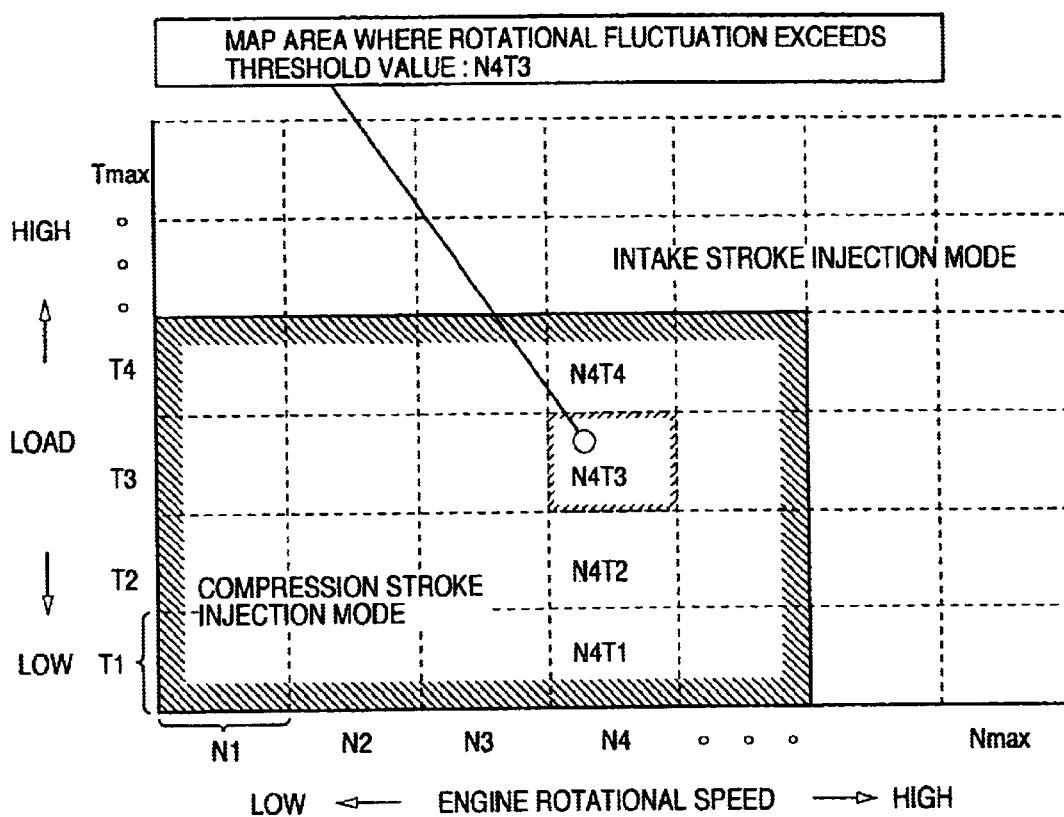
FIG. 5 is a control map based on the rotational speed and the load of an engine relating to the description of the combustion stabilizing control by the intake stroke injection mode of the combustion stabilizing means of FIG. 3.

First, FIG. 5 shows a control map for the operation mode provided in the ECU 36, wherein the abscissa axis (engine rotational speed) and the ordinate axis (engine load) are respectively divided into a plurality of sections at predetermined value ranges. These divided sections will be referred to map areas for the sake of convenience. Each map area is designated either for the intake stroke injection mode or the compression stroke injection mode depending on the engine rotational speed and load.

For example, in a map area N4T3 of the compression stroke injection mode, when combustion is deteriorated during operation and the fluctuation level of rotation exceeds the threshold, first the combustion stabilizing control by the intake stroke injection mode is permitted as described above. Next, to recover combustion stability, switching from the area N4T3 in which combustion has been deteriorated toward a direction in which the intake stroke injection mode is set. That is, in FIG. 5, a map area with higher load is changed from the compression stroke injection mode to the intake stroke injection mode.

Figure 6:
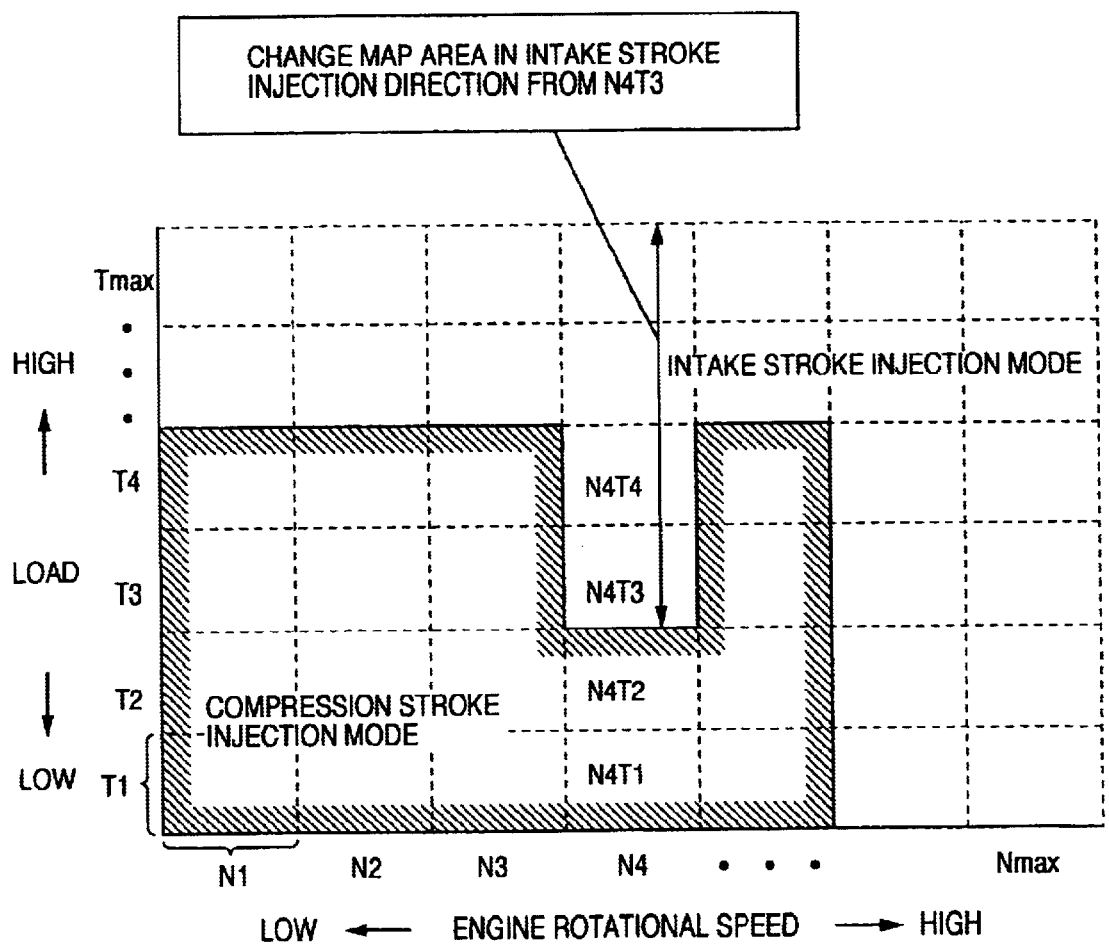
FIG. 6 is a control map based on the rotational speed and the load of the engine after the change shown in FIG. 5.

That is, as shown in the compression stroke injection mode region after combustion stabilization control in FIG. 6, the fuel injection control means 51 and the continuation time calculation means 52 of the combustion stabilizing means 40 change areas, in which the threshold value is exceeded, from the operation region of the compression stroke injection mode into the operation region of the intake stroke injection mode to switch the injection mode. In this way, by switching the operation mode to the intake stroke injection mode for only the map areas where combustion has been deteriorated, it is possible to improve fuel economy compared to the case of switching the injection mode for all the areas. Although the switching extent of the map areas is defined from the map area where combustion has been deteriorated toward the direction in which the intake stroke injection mode is set, it is also possible to switch the injection mode to the intake stroke injection mode for all the map areas which exist in the same engine rotational speed range, that is, map areas with engine rotational speed N4 including areas N4T1 and N4T2 in FIG. 6.

Figure 7:
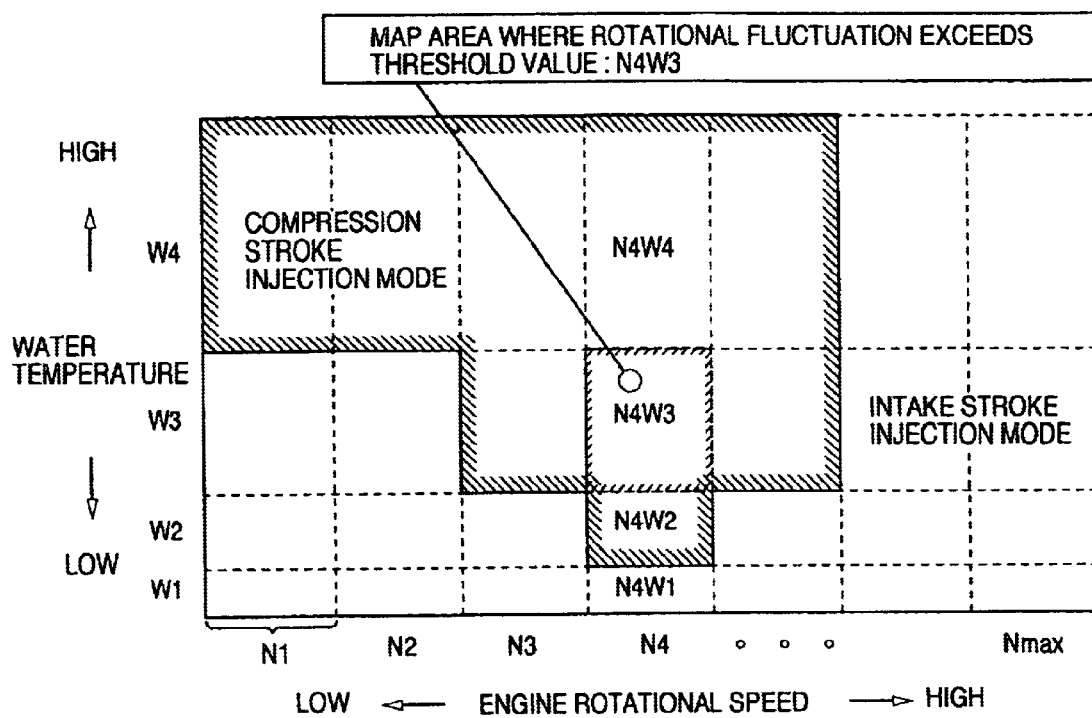
FIG. 7 is a control map based on the rotational speed and the water temperature of the engine of FIG. 5.

FIG. 7 also shows a control map of operation mode provided in the ECU 36 in which the abscissa axis (engine rotational speed) and the ordinate axis (engine load) are respectively divided into a plurality of sections at predetermined value ranges.

Each map area is determined to the intake stroke injection mode or the compression stroke injection mode on the basis of the engine coolant temperature and the engine rotational speed. For example, when the fluctuation of rotational speed exceeds a threshold during operation due to deteriorated combustion in the map area N4W3 of the compression stroke injection mode, to recover the combustion stability, switching from the area N4W3 in which combustion has been deteriorated toward a direction in which the compression stroke injection mode is set is effected. That is, in FIG. 7, a map area on the lower temperature side is switched from the compression stroke injection mode to the intake stroke injection mode.

Figure 8:
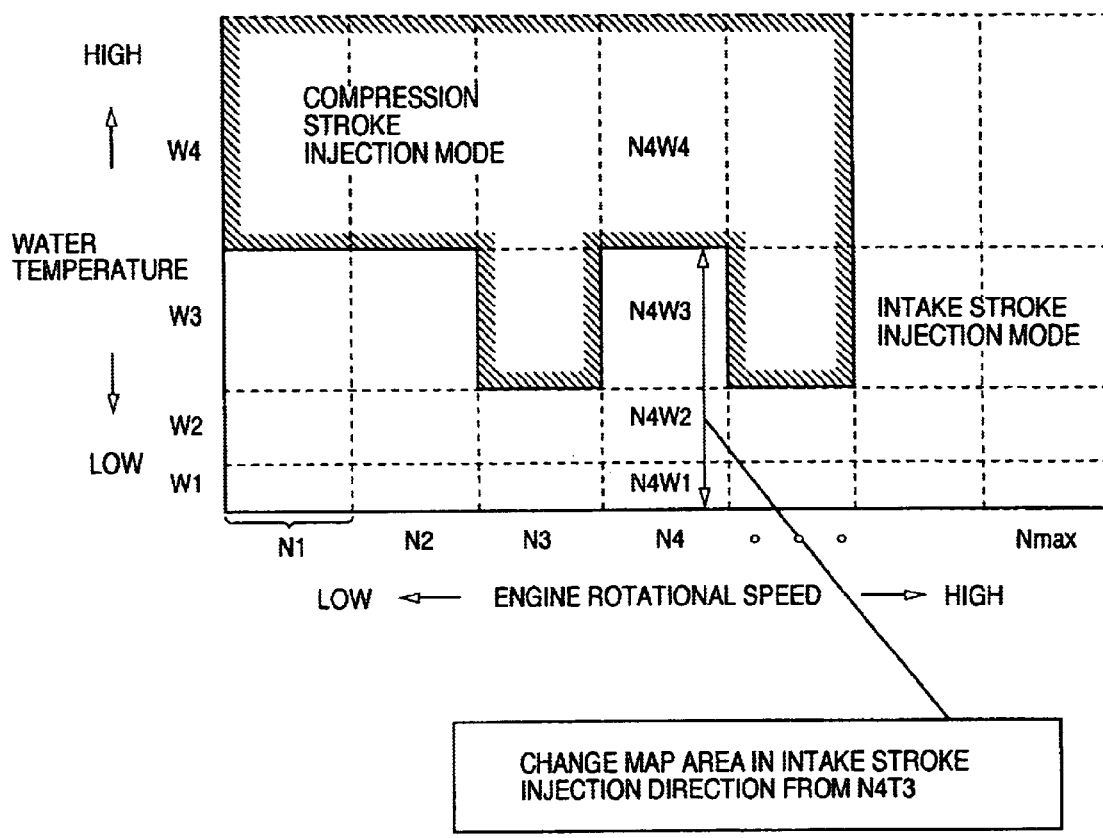
FIG. 8 is a control map based on the rotational speed and the water temperature of the engine after the change shown in FIG. 7.

That is, as shown in the compression stroke injection mode region after the combustion stabilizing control in FIG. 8, the fuel injection control means 51 and the continuation time calculation means 52 change areas, in which the threshold value is exceeded, from the operation region of the compression stroke injection mode into the operation region of the intake stroke injection mode to switch the injection mode. In this way, since the injection mode is switched to the intake stroke injection mode only for the map areas in which combustion is deteriorated, it is possible to reduce fuel consumption, as in the case with the above described control map between the engine load and rotational speed, compared to the case in which the injection mode is switched for all the operation regions.

Next, the combustion stabilizing control by the compression stroke injection mode will be described.

Figure 9:
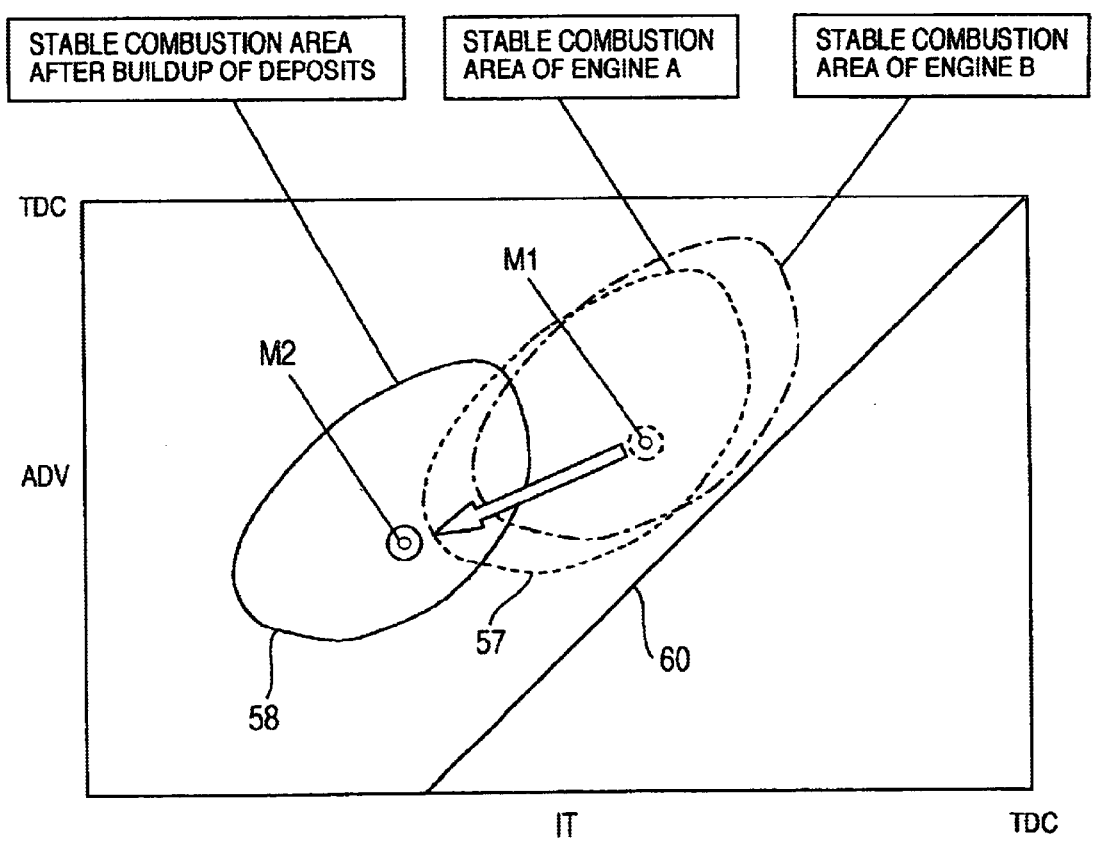
FIG. 9 is a view showing aging of a stable combustion area with respect to the fuel injection timing and the ignition timing relating to the description of the combustion stabilizing control by the compression stroke injection mode of the combustion stabilizing means in FIG. 3.
Figure 10:
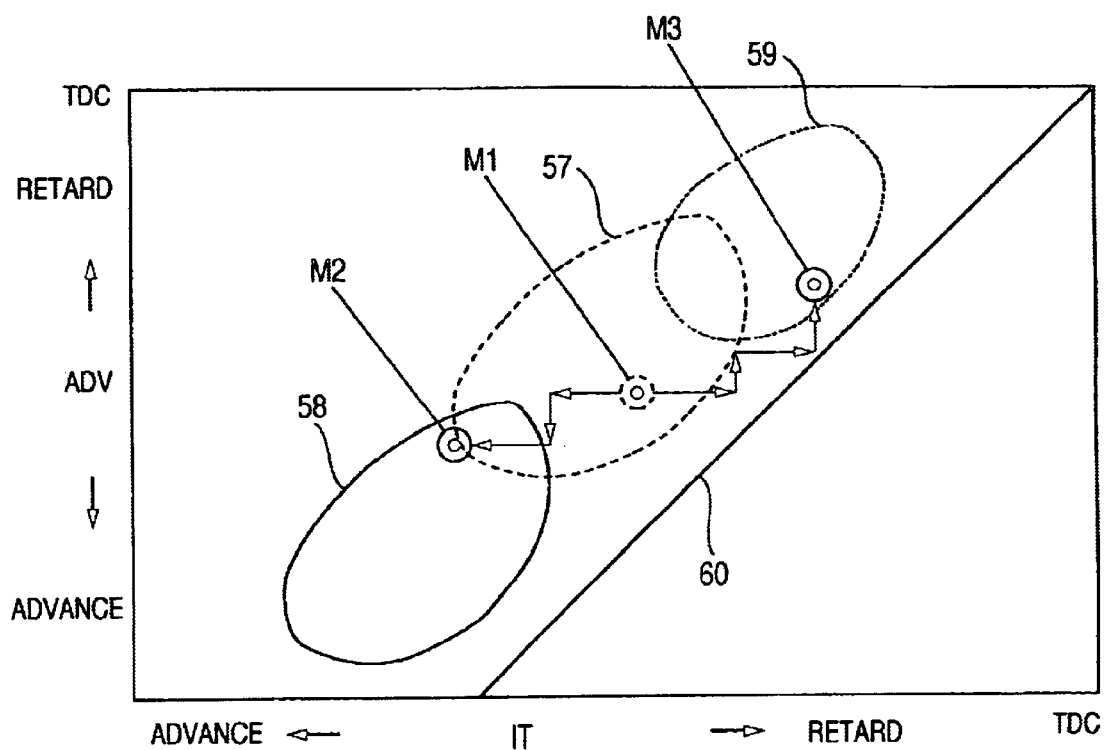
FIG. 10 is a view showing a searching method of stable combustion areas provided in a fuel injection timing control means and an ignition timing control means of FIG. 9.
Figure 11:
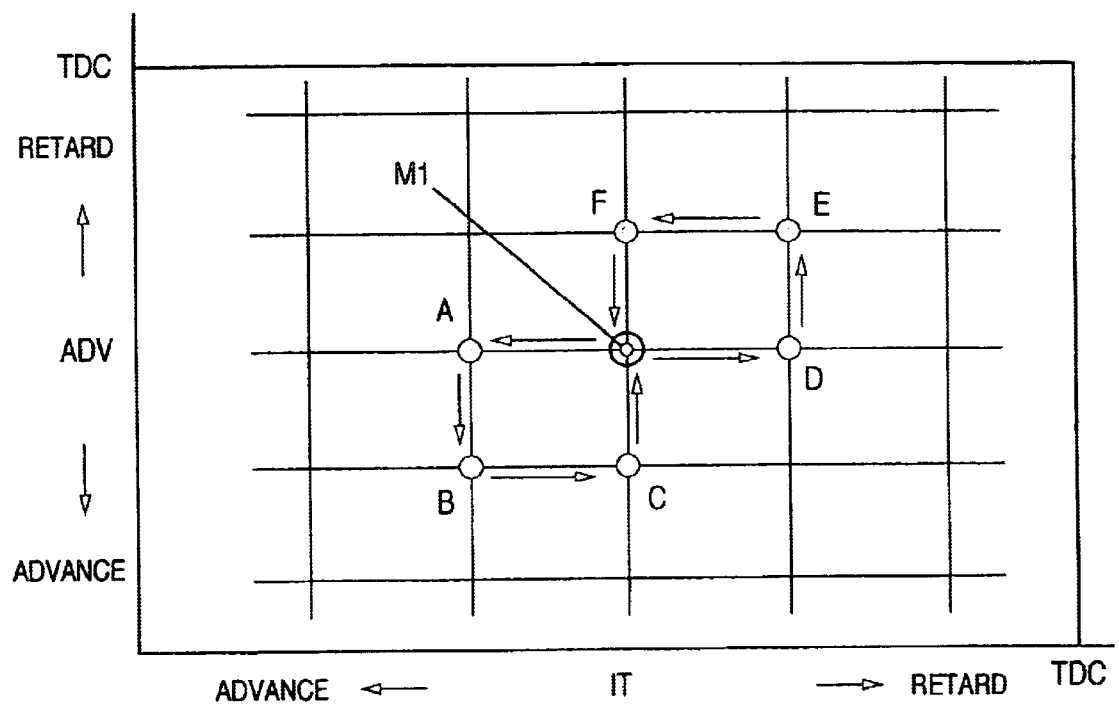
FIG. 11 is a IT/ADV control map provided in the fuel injection timing control means and the ignition timing control means of FIG. 9.

FIGS. 9 to 11 relate to the fuel injection timing control means 53a and the ignition timing control means 53b of the parameter trial operation means 53.

FIG. 9 is a view to explain the concept of IT/ADV control map which is part of the fuel injection programs incorporated in the storage device in the ECU 36 and is a control map for the control parameters: the fuel injection start timing (IT) and the ignition timing (ADV).

In general, a setting point of IT and ADV is determined based on the result of verification tests by experimental engines at operation representing point at which a plurality of patterns are considered depending on the engine operating conditions such as engine rotational speed, engine load, and injection mode.

FIG. 9 shows stable combustion areas with enhanced combustion quality in the map of IT and ADV, where an initial stabilized combustion area for an engine A is shown in a dotted line and an initial stabilized combustion area for another engine B in an alternate long and short dash line. It is appreciated that individual engines differ in both the extent and the position of stabilized combustion area even in the initial state. These differences occur because there are variations in amounts of injection of the fuel injection valves and in air delivery due to variation in assembly of the airflow generation valves in each of the plurality of cylinders in each individual engine even in early stages of engine operation. Therefore, the values of IT and ADV at an operation setting point M1 is preferably determined taking the combustion stability and the above described variation factors into account.

Also, for the engine A, a changed area of IT and ADV for stable combustion due to aging of the engine is shown in a solid line. Here, one factor causing the deterioration of combustion is possibly a state in which fuel spray is not properly vaporized because of the buildup of deposits around the injection opening of the fuel injection valve as described above. This is a phenomenon in which the spray pattern of the fuel spray changes causing the angle of the outer shape of the spray to expand, and thereby the penetration force of the spray is decreased causing the spray transfer speed to be lowered. For this reason, the stabilized combustion region will be moved in a direction of advancing IT angle with respect to the initial position, and therefore combustion will be further deteriorated if operation is performed by the compression stroke injection mode at the initial operation setting point. Therefore, combustion stability is maintained by resetting the values of IT and ADV of the control parameters by means of the parameter trial operation means 53 of the combustion stabilizing means 40 as will be described below.

FIGS. 10 and 11 are views to show the resetting method of IT and ADV by the fuel injection timing control means 53a and the ignition timing control means 53b of the parameter trial operation means 53.

FIG. 10 is the IT/ADV control map of the fuel injection timing.

When combustion deterioration due to the decline of spray penetration power at a grid point M1 which has been initially set in a stable combustion region at an early period of engine operation is detected, the parameter trial operation means 53 judges the combustion stability at a new grid point by advancing the IT by a predetermined angle with fuel injection timing control means 53a. When the degree of the combustion stability is not enough, the combustion stability is judged by next advancing the angle of ADV with the ignition timing control means 53b. For example, as in the same manner that the combustion stabilized area reaches the area 58 when the spray penetration power is weakened due to the buildup of deposits, a grid point M2 of IT and ADV at which combustion is stabilized is searched by alternatively advancing the values of IT and ADV to determine the stability of combustion at each grid point until combustion stability is recovered.

When combustion deterioration due to diffusion of the spray at a grid point M1 which has been initially set in a stable combustion region 57 at an early period of engine operation is detected, the combustion stability at a new grid point is determined by retarding the IT by a predetermined angle. And, if the degree of combustion stability is not sufficient at this point, combustion stability is determined by retarding ADV, and then, for example, as in the same manner as the combustion stabilized area reaches the area 59 when the fuel spray is diffused due to the changes in airflow, a grid point M3 of IT and ADV at which combustion is stabilized is searched by alternately retarding IT and ADV to determine the combustion stability at each grid point until combustion stability is recovered.

Moreover, in the control map of FIG. 10, by arranging the changing direction of IT and ADV substantially in parallel with a line of IT=ADV line 60 (line connecting points at which IT and ADV have same crankshaft angles), following advantages will be achieved.

As shown in FIG. 10, it will be noticed that combustion stability area tends to distribute substantially in parallel with the line of IT=ADV 60 in the IT/ADV control map. This is why it takes some time elapse in order that mixing of fuel spray and air progresses forming an ignitable mixture before the fuel spray reaches the spark plug 9 since it is injected from the fuel injection valve 8. Therefore, in view of the fact that for same engine rotational speed and load, the formation time of an ignitable mixture will not change significantly, it will be possible to reach a grid point at which combustion is stabilized more quickly by changing the values of IT and ADV in the direction substantially in parallel with the line of IT=ADV.

Also, considering that the grid point M1 of initial setting is determined based on combustion stability and the rate of fuel consumption, etc., and therefore changing the ADV may cause deterioration of fuel consumption rate, it will be possible to select a grid point at which combustion is stabilized while restricting the deterioration of fuel consumption rate by changing IT and ADV in such a way that a change amount of ADV is smaller than a change amount of IT.

In FIG. 11, the direction in which IT and ADV are first changed, as described above, is explained.

The direction in which IT and ADV are first changed is decided by determining whether a combustion stabilized area is in the IT advancing direction or in the IT retarding direction by measuring the level of fluctuation of rotation successively from initially set grid point M1 to its surrounding grid point.

That is to say, as shown in the drawing, by performing operations of measuring the fluctuation level of rotation for each point ranging from the initial set point M1 to grid points of IT/ADV, A to F for a predetermined time period and then going back to the point M1 thereafter, the average value of levels of the fluctuation of rotation at grid points A, B, C and the average value of levels of the fluctuation of rotation at grid points D, E, F are calculated respectively for comparison. Then, from this result, a direction of IT in which the fluctuation level of rotation decreases is determined to make it the direction in which IT is first changed.

When a grid point at which fluctuation level of rotation is not larger than a threshold vale is included in the six grid points A to F, the grid point with the lowest fluctuation level of rotation may be immediately chosen as the setting point. The interval of the grid points to be used for determination of fluctuation level of rotation may be set to each of the minimum units of IT and ADV, or the interval of grid points may be preset for the above described determination operation.

Figure 12:
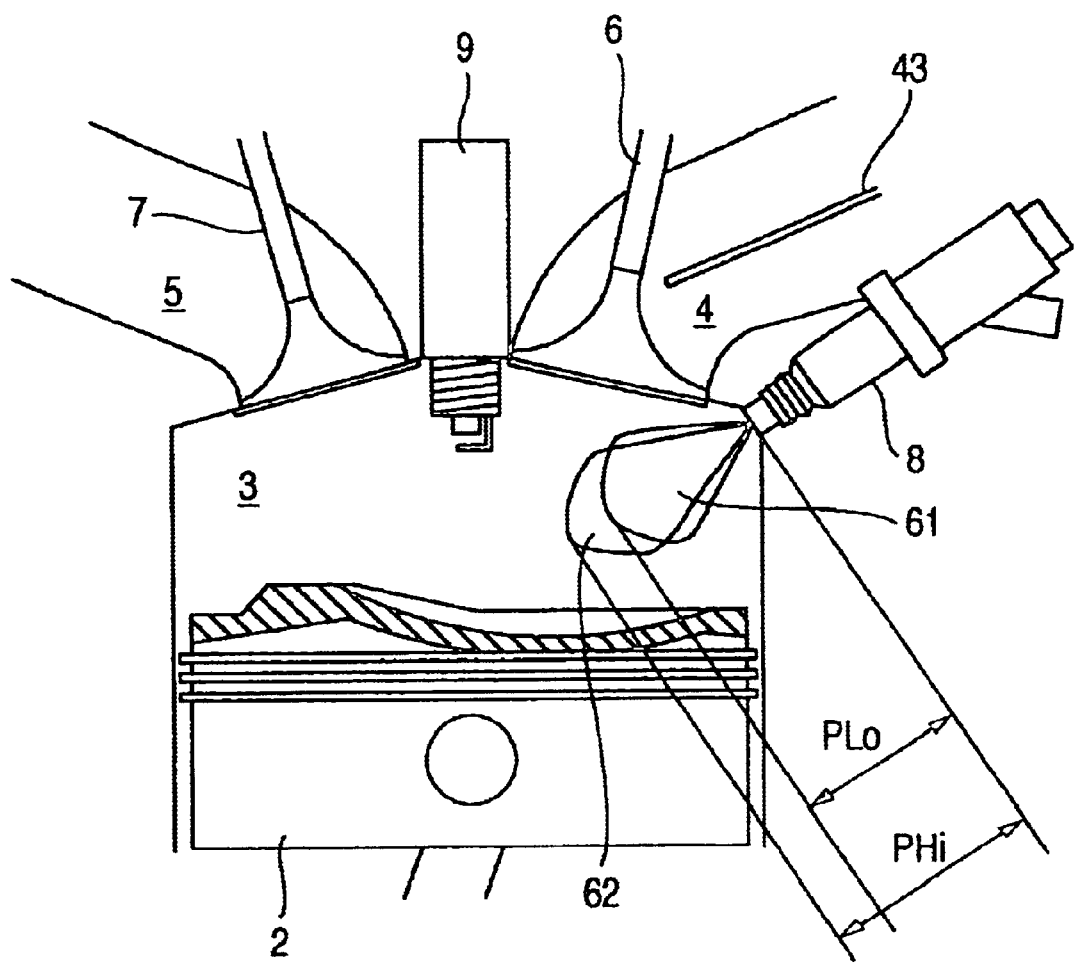
FIG. 12 is a view showing fuel spray ranges by different fuel pressures relating to the description of the combustion stabilizing control by the compression stroke injection mode of the combustion stabilizing means of FIG. 3.
Figure 13:
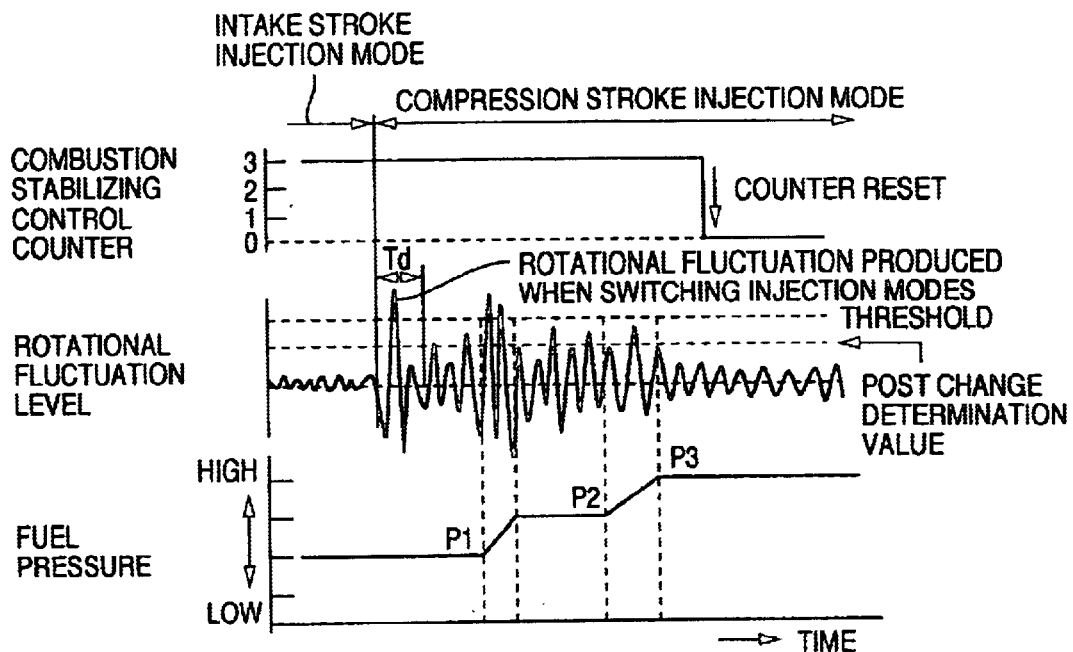
FIG. 13 is a view showing a fuel pressure control method according to the fuel pressure control means of FIG. 12.

Next, FIGS. 12 and 13 relate to the fuel pressure control means 53c of the parameter trial operation means 53.

The fuel pressure control means 53c changes throw range of the fuel spray by changing the fuel pressure to be provided to the fuel injection valve 8. In FIG. 12, the throw range PLo of the spray 61 with a relatively low fuel pressure is different from the throw range PHi of the spray 62 with a higher fuel pressure, and a higher fuel pressure produces a higher travel speed of fuel spray. Moreover, when the fuel is mixed with air as the fuel spray travels, a fuel spray 62 with a higher fuel pressure has a larger travel range in a given time and therefore is more easy to be mixed. Therefore it is possible to change the arrival time of an ignitable mixture to the spark plug 9 by increasing/decreasing the fuel pressure to improve the combustion quality.

FIG. 13 is an operational timing chart of the fuel pressure control means 53c showing the operation from the moment when the injection mode is switched from the intake stroke injection mode to the compression stroke injection mode till the moment of recovery of combustion stability.

First, upon switching the injection mode, since a fluctuation of rotation caused by response delay of an amount of air supply occurs, measurements are excluded from the values for the rotational fluctuation determination until a predetermined time Td elapses immediately after the switching to prevent erroneous determination.

After a predetermined time Td elapses, when a determination is made that the fluctuation of rotation has exceeded a predetermined threshold, fuel pressure is raised from P1 to P2 by a predetermined amount. Thereafter, when recovery of combustion stability is still not sufficient, this operation is repeated in a similar manner as further raising the fuel pressure from P2 to P3, and when the fluctuation of rotation level is equal to or lower than a post change determination value which is lower than the threshold, the recovery control by the fuel pressure control means 53c is terminated.

Also, by providing the above described post-change determination value, even when variation of the fluctuation level of rotation occurs, it is possible to prevent erroneous determination due to the variation, thus preventing the fuel pressure control means 53c from being reactivated.

The fuel pressure control means 53c is configured to operate in an increasing direction of the fuel pressure, but when the maximum fuel pressure of the fuel system is limited by the pressure limit of the high-pressure pump 12, the direction may be changed to the decreasing direction. In this case, the lowered fuel pressure increases the injection period of the fuel injection valve 8 and therefore the supply time of the mixture moving toward the spark plug 9 thereby increasing the ignitable period.

FIGS. 14 to 17 relate to the split injection control means 53d of the parameter trial operation means 53.

The split injection control means 53d refers to share ratio of injection amount, injection timing, injection interval, and the like between a first and a second injections which are injected into the cylinder 1, from a control map or a control table depending on the pressure in the intake manifold detected by the pressure sensor 28 and the fuel pressure detected by the fuel pressure sensor 11.

While operating in the compression stroke injection mode, voltage-drop detection means (not shown) continuously monitors voltage fluctuations of the power supply and continues split injection control to permit a second injection only when a determination is made that a second injection can be performed without a problem. In this way, by controlling the injection according to the engine conditions, stable operation of the compression stroke injection mode can be performed.

Next, the method of recovering the combustion stability by controlling air/fuel mixing through the split injection control means 53d which is one aspect of the above described mixing acceleration means of air and fuel.

Figure 14:
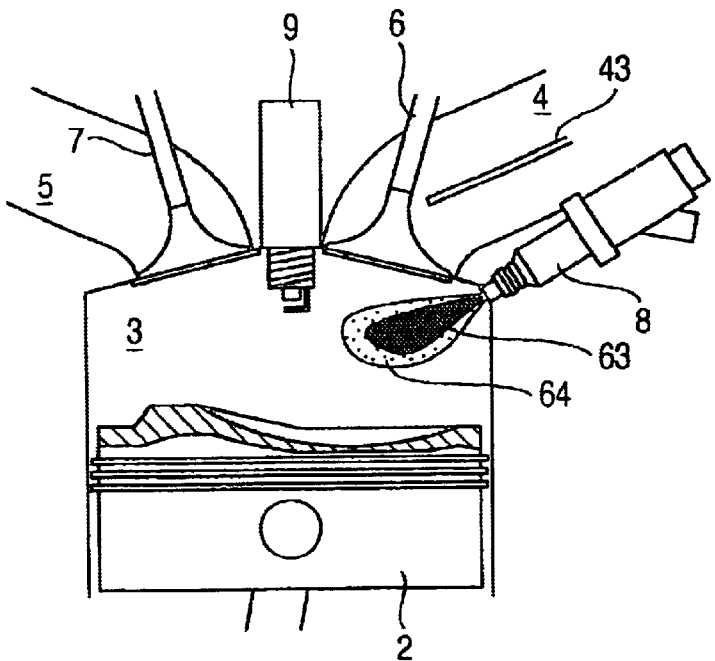
FIG. 14 is a schematic view showing a spray condition near the top dead center in the case of a single injection relating to the description of the combustion stabilizing control by the compression stroke injection mode of the combustion stabilizing means of FIG. 3.
Figure 15:
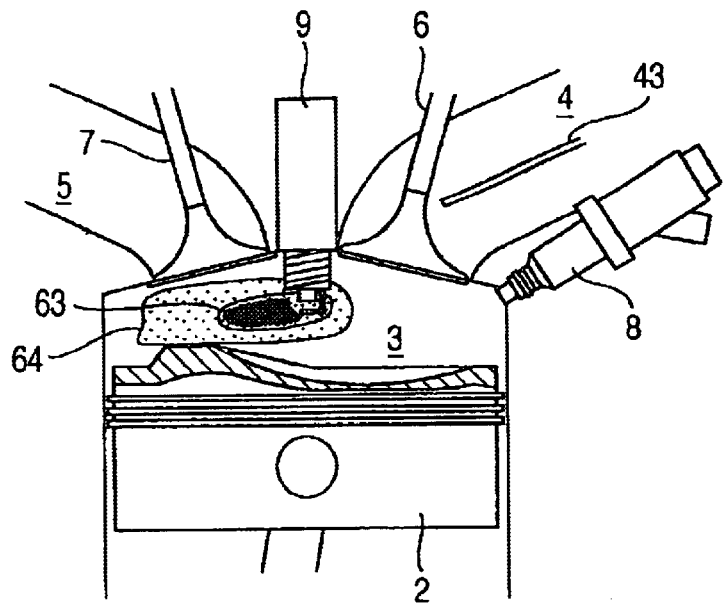
FIG. 15 is a schematic view showing the spray condition at the moment of ignition in the case of single injection shown in FIG. 14.

FIGS. 14 and 15 are schematic diagrams to show the spray condition during compression stroke.

FIG. 14 shows a spray condition just after injection which has been performed during compression stroke in a single injection, wherein just after the injection, a fuel over-rich portion 63 is formed wherein the fuel distribution in the central part of the spray is excessively dense, but as the spray moves into the cylinder 1, mixing with air proceeds from the spray peripheral part 64 by the airflow in the cylinder 1 and the tumble flow preserved until the time of the compression stroke.

FIG. 15 shows a spray condition just before ignition in which the piston has further moved up, and an ignitable mixture is distributed around the spark plug 9, but there still remains some fuel over-rich portion 63 in which mixing is not sufficient. If the mixture is ignited in this state, the fuel in the fuel over-rich part 63 will not burn completely thereby causing combustion deterioration due to the smoked-covered spark plug 9. Also, in a supercharged direct injection engine such as the present invention, since the in-cylinder pressure during compression stroke is higher than that of a natural aspiration engine, a shrink ratio of outer shape of the spray becomes large. For this reason, since there is tendency to form fuel over-rich portion 63, it is important to promote the mixing of fuel with air to perform the compression stroke injection mode operation under supercharging.

Figure 16:
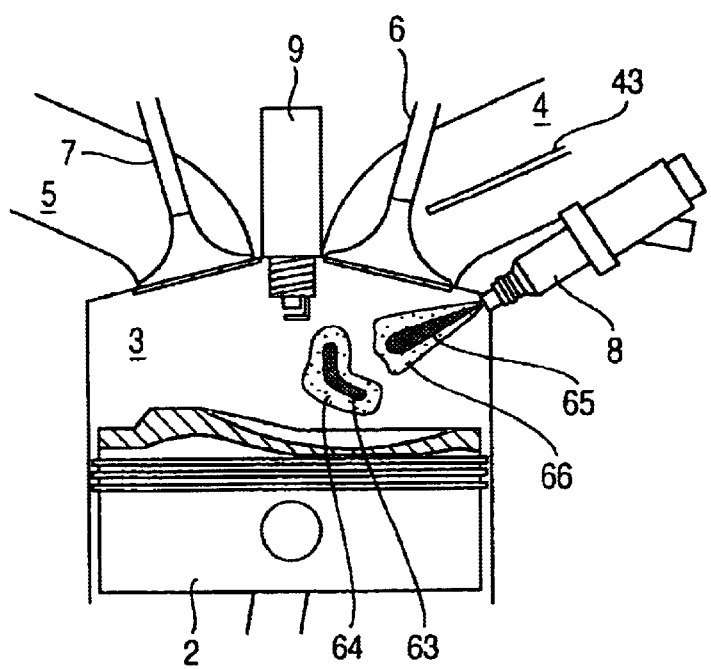
FIG. 16 is a schematic view showing the spray condition near the top dead center in the case of 2 injections by a split injection means of FIG. 14.
Figure 17:
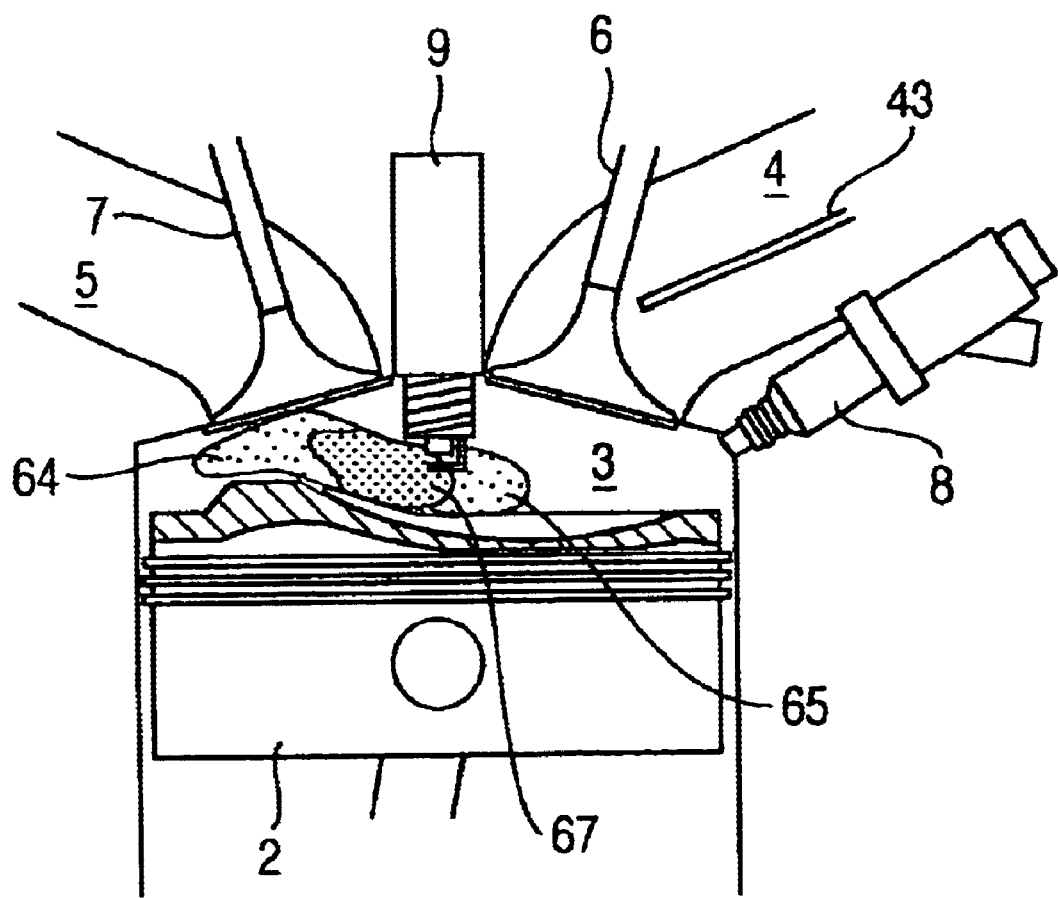
FIG. 17 is a schematic view showing the spray condition at moment of ignition in the case of 2 injections by the split injection means of FIG. 14.

FIGS. 16 and 17 show a split injection by use of the split injection control means 53d, in which two injections are performed using a deflection spray injection valve with a cone-type spray during compression stroke. FIG. 6 shows a spray condition just after the second injection is over.

As shown in FIG. 16, following a fuel spray 64 of the first injection, a fuel spray 66 of the second injection is injected successively. It will be noticed that split injection causes surface areas of the spray peripheral parts 64, 66 to increase compared to the case of single injection as described above. By this configuration, mixing of fuel and air in the fuel over-rich portions 63, 65 will be promoted.

FIG. 17 shows a state just before ignition in which the piston has moved up further. In this moment, mixing of air and fuel in the spray peripheral part 64 proceeds as the fuel spray moves, and it will be noted that an ignitable fuel distribution exists around the spark plug 9.

That is, in the first injection, spray travel speed is reduced as the mixing of the spray proceeds, and in the second injection which is injected later, since the spray travels through the cylinder 1 in which pressure is raised as the piston 2 moves up, an overlap area 67 in which the mixture distribution of the first injection overlaps with the mixture distribution of the second injection around the spark plug 9 is formed, thereby prolonging the ignitable period of the ignition timing, and thus it is possible to advance the timing compared to the above described case of a single injection. By this arrangement, since sufficient combustion time is preserved, it produces the effect of reducing the smoke and moreover reducing the HC emission ratio.

It is also possible to change air/fuel ratio around the spark plug 9 by increasing/decreasing the injection interval between the first and second injections. That is, extending the injection interval will reduce the overlap area of fuel sprays around the spark plug 9, thereby making air/fuel ratio lean at the moment of ignition.

As so far described, the split injection control means 53d can prevent the spark plug 9 from being smoke-covered by increasing/decreasing the number of injections by the split injection so as to promote the mixing of air and fuel, thereby recovering the combustion stability.

Figure 18:
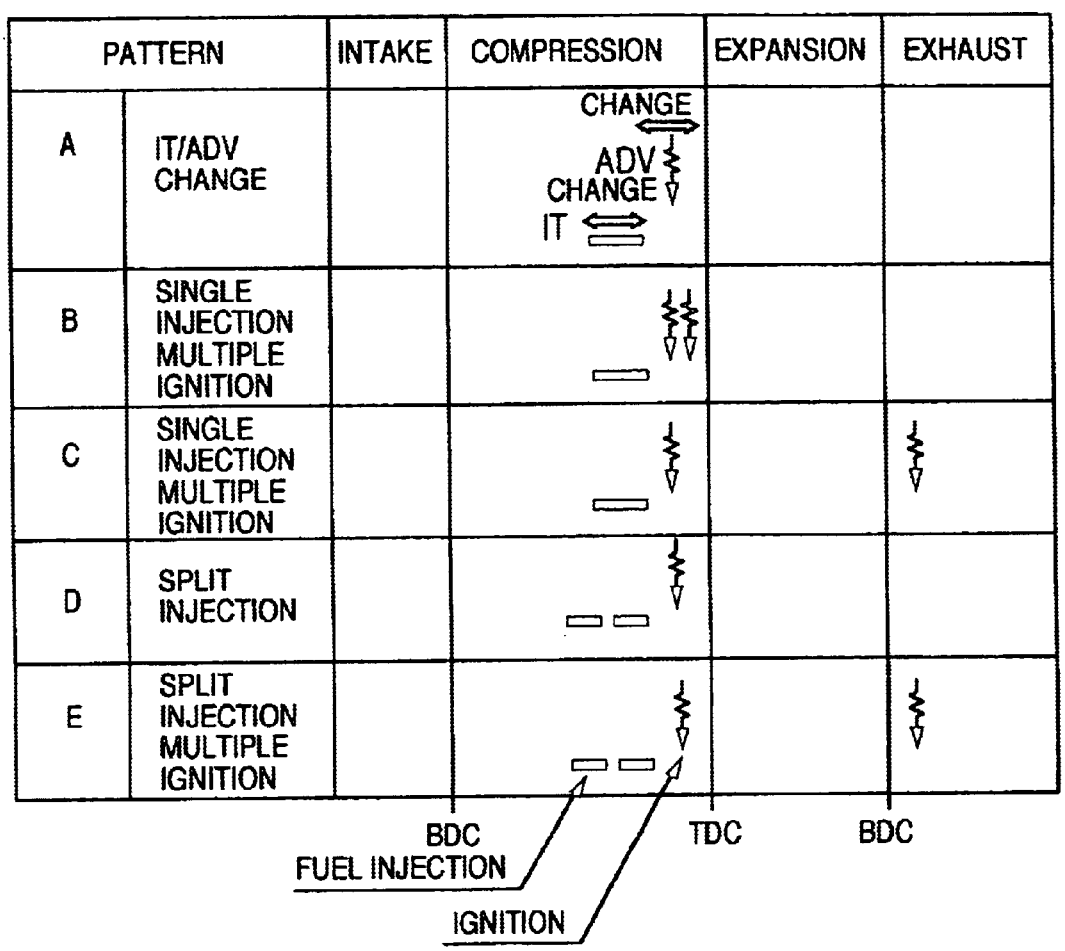
FIG. 18 is an explanatory view showing the recovery of combustion stability performed in combination by the fuel injection timing control means, the ignition timing control means, and the split injection control means relating to the description of the combustion stabilizing control by the compression stroke injection mode of the combustion stabilizing means of FIG. 3.

Next, referring to FIG. 18, the recovery of combustion stability performed in combination by the fuel injection timing control means 53a, the ignition timing control means 53b, and the split injection control means 53d of the parameter trial operation means 53 will be described.

A pattern A shows the recovery of combustion stability performed in combination by the fuel injection timing control means 53a and the ignition timing control means 53b, in which stable combustion is performed by advancing or retarding IT and ADV respectively depending on the combustion state in usual compression stroke injection mode operation.

A pattern B also shows recovery of combustion stability performed in combination by the fuel injection timing control means 53a and the ignition timing control means 53b, in which ignition is performed twice for a single injection thereby extending an ignitable period at the spark plug 9.

A pattern C also shows recovery of combustion stability performed in combination by the fuel injection timing control means 53a and the ignition timing control means 53b, in which a second ignition is performed during exhaust stroke in contrast to the pattern B. This second ignition is intended to prevent spark plug pollutions such as smoke-covering of spark plug 9 caused by the ignition of an excessively dense mixture and spark plug wetting caused by droplets which have reached the spark plug 9 due to the changes in the spray pattern.

A pattern D shows recovery of combustion stability performed in combination by the ignition timing control means 53b and the split injection control means 53d, in which split injections are performed during compression stroke injection.

A pattern E also shows recovery of combustion stability performed in combination by the ignition timing control means 53b and the split injection control means 53d, in which a second ignition is performed in the exhaust stroke in contrast to the pattern D.

These patterns are intended to promote the mixing of fuel spray and air by means of the fuel injection control means 53a and the split injection control means 53d, and further to achieve self-cleaning of the spark plug 9 by means of the ignition timing control means 53b. As described so far, it is possible to achieve early recovery of combustion stability by combining each control means.

Figure 19:
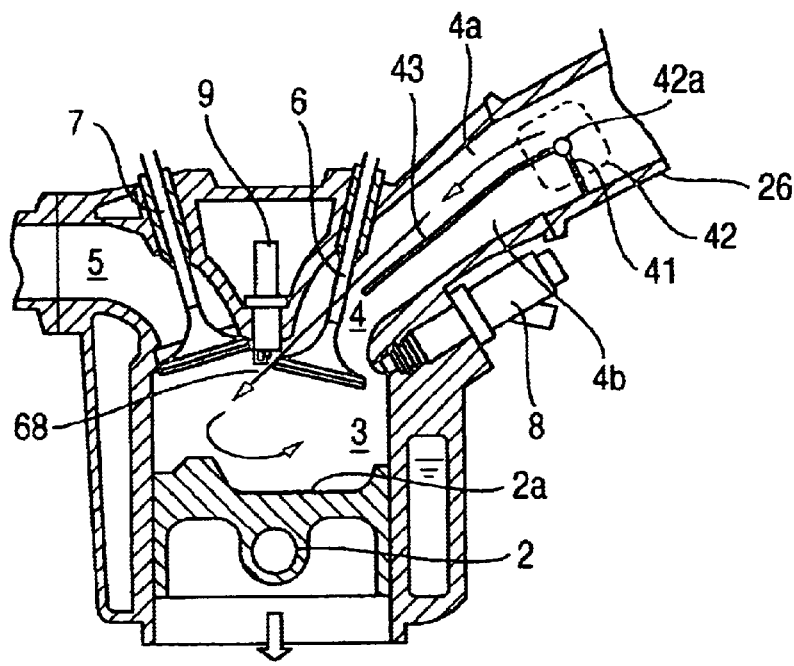
FIG. 19 is a schematic view showing the intake stroke by means of the airflow control means relating to the description of the combustion stabilizing control by the compression stroke injection mode of the combustion stabilizing control means of FIG. 3.
Figure 20:
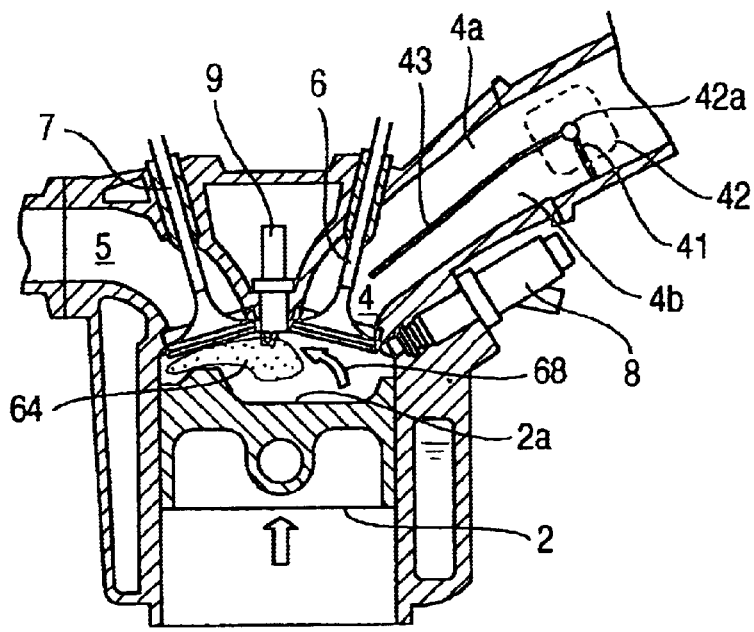
FIG. 20 is a schematic view showing the compression stroke according to the airflow control means of FIG. 19.

Next, FIGS. 19 and 20 relate to the airflow control means 53e of the parameter trial operation means 53.

FIG. 19 shows a state during intake stroke of an engine having TCV 41 in the intake port 4.

In the intake port 4, there is provided a partition plate 43 which divides the interior of the port into two sections: a second section or upper port 4a and a first section or lower port 4b. In the intake pipe 26 facing the intake port 4, there is arranged a valve open/close mechanism 42 driven by a motor or a diaphragm actuator, and TCV 41 is supported by the shaft 42a of the valve open/close mechanism so as to rotate synchronously. And, TCV 41 can change the opening area of the divided lower port 4b thereby increasing/decreasing the strength of airflow generated in the intake stroke. As shown in the drawing, by closing the lower port 4b to increase the air passage through the upper port 4a, it is possible to generate a forward direction tumble flow 68 moving from the intake valve 6 to the exhaust valve 7 in the cylinder 1.

FIG. 20 shows a state of the compression stroke of the same engine.

The forward direction tumble flow 68 which is preserved till the compression stroke moves from a piston crown surface 2a to the spark plug 9 again passing near the intake valve 4. Therefore, the fuel spray 64 moves toward the spark plug 9 from a side of the intake valve 4.

Thus, by increasing the strength of the airflow through the valve open/close mechanism 42 and TCV 41, the airflow control means 53e can enhance the progress of mixing of fuel and air from the peripheral part of the spray by the preserved tumble flow 68 even when an over-rich fuel part exist near the center of the fuel spray, and it is possible to ignite the mixture with a suitable air/fuel ratio since it is pushed up toward the spark plug 9.

Next, FIGS. 21 to 25 relate to combination of the EGR control means 53g and the variable valve control means 53f of the parameter trial operation means 53.

The EGR control means 53g relates to an outer EGR mechanism for introducing burnt gas to the intake port 4 from other pipe path 69. The other hand, the variable valve control means 53f relates to an inner EGR mechanism for introducing burnt gas into the cylinder 1 by increasing/decreasing the valve overlap amount of the intake/exhaust valves.

Figure 21:
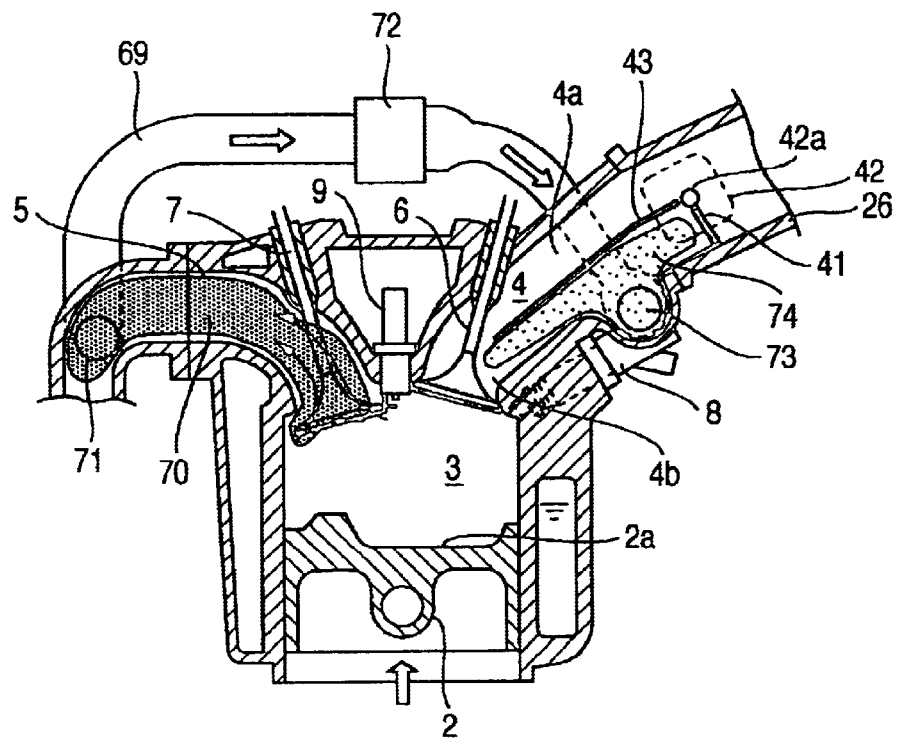
FIG. 21 is a schematic view showing the exhaust stroke according to the EGR control means relating to the description of the combustion stabilizing control by the compression stroke injection mode of the combustion stabilizing control means of FIG. 3.

As shown in FIG. 21, an introduction mechanism of outer EGR gas takes out burnt gas from the exhaust manifold 29 and consists of at least one EGR pumping outlet 71, an EGR piping 69 in communication with the EGR pumping outlet 71, an EGR control valve 72 for controlling an amount of the EGR gas into the intake port 4, and an EGR inlet 73 for introducing the outer EGR gas delivered to a lower port 4*b* in each cylinder 1 through the EGR control valve 72, and the opening of the EGR control valve 72 is controlled by the EGR control means 53*g*.

Although the variable valve control means 53*f* is not shown in FIG. 21, it is provided with the variable valve mechanisms 44 to 47 for driving the intake valve 6 and the exhaust valve 7 respectively as shown in FIG. 2.

FIG. 21 shows a state of the exhaust stroke in the compression stroke injection mode operation.

In this state, since TCV 41 is closed by the valve open/close mechanism 42 provided in the intake pipe 26, the outer EGR gas 74 is introduced into the lower port 4*b* from the EGR inlet 73.

Figure 22:
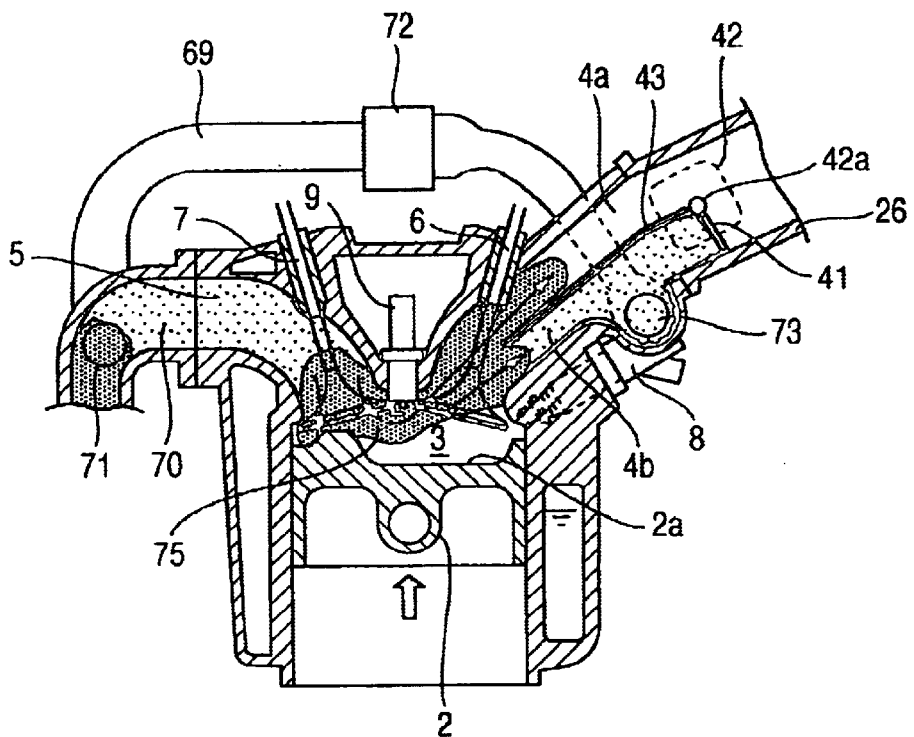
FIG. 22 is a schematic view showing the compression stroke by the EGR control means and the variable valve train control means of FIG. 21.

FIG. 22 shows a state of just before a top dead center, at which a further time has elapsed from the state shown in FIG. 21.

In this state, the variable valve control means 53*f* retards the closing timing of the exhaust valve 7 and, in addition, advances the opening timing of the intake valve 6 thus increasing the region, so called a valve overlap, in which operation crank angle periods of the intake and exhaust valves 6, 7 are overlapped. And, the inner EGR gas 75 which is part of the burnt gas is redirected to the combustion chamber 3 from the exhaust manifold 29 while flowing into the intake port 4.

Here, the intake port 4 is divided into the upper port 4*a* and the lower port 4*b* by the partition plate 43, and in this configuration, since TCV 41 is fully closed or in the closing side, the airflow is reduced thereby causing more inner EGR gas 75 to flow into the upper port 4*a*.

Figure 23:
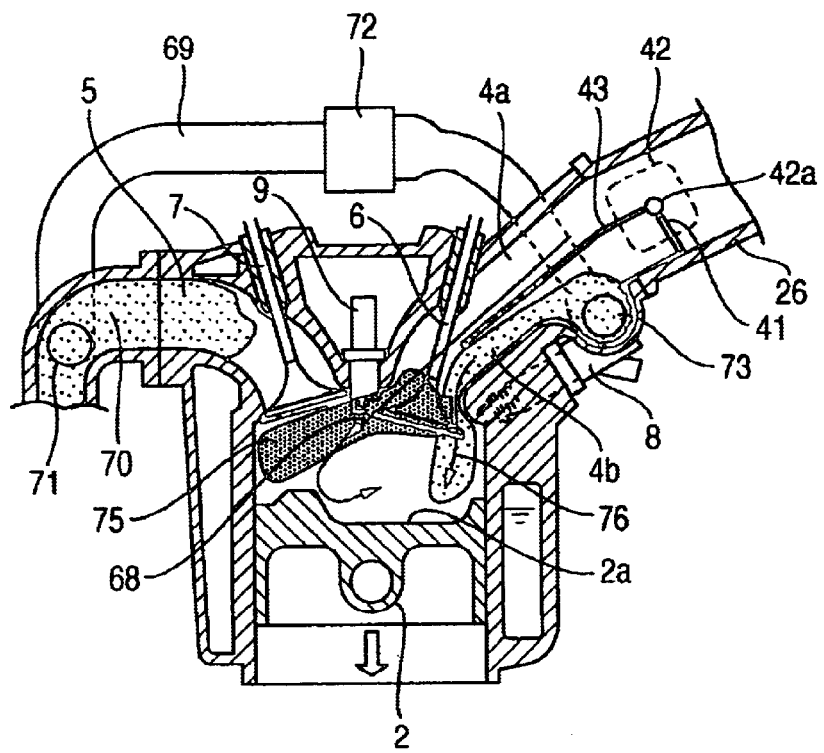
FIG. 23 is a schematic view showing the intake stroke by the EGR control means and the variable valve train control means of FIG. 21.

FIG. 23 shows a state at which the piston 2 moves downward during intake stroke.

In the intake stroke injection mode, TCV 41 is kept closed as described above thereby closing the lower port 4*b*, and therefore the intake air starts flowing into the combustion chamber 3 through the upper port 4*a*. And the inner EGR gas 75 which has been introduced into the upper port 4*a* earlier is first introduced into the combustion chamber 3 joining the stream of the intake air, and successively the intake air flows into the chamber thus generating a strong tumble flow 68 in the cylinder 1. Also the EGR gas 76 introduced into the lower port 4*b* is taken into the cylinder 1 by the downward flow by the piston 2 thereby being directed to the intake valve side of the piston crown surface 2*a* along the inner wall surface of the cylinder 1.

In this situation, since introducing the outer EGR gas into the cylinder 1 will reduce the flame propagation speed thereby mitigating the progress of the combustion, it is possible to reduce the Nox emission. However, excessively increasing an amount of the outer EGR gas introduction will cause deterioration of combustion.

The other hand, the inner EGR gas is an inert gas as well, but since it is introduced into the cylinder 1 directly from the exhaust port 5, it has a higher gaseous temperature than that of the outer EGR gas, and therefore there is an effect in facilitating the vaporization of the over-rich part in the center of the fuel spray.

Therefore, the EGR control means 53*g* and the variable valve control means 53*f* prevent deterioration of the combustion by focusing on the mixing of air and fuel and by changing the ratio of amounts of introducing two EGR gases on the basis of the fact that an amount of the outer EGR gas introduced from the exhaust manifold 29 affects the combustion stability. Here, an inner EGR is to introduce burnt gases into the cylinder 1 exploiting the valve overlap between the intake and exhaust valves 6, 7 and an outer EGR is to introduce burnt gas into the intake port 4 through the piping 69 from the exhaust manifold 29. That is, when deterioration of the combustion is detected from the fact that the fluctuation of rotation exceeds a threshold, it is possible to recover the combustion stability by reducing the amount of the outer EGR gas with the EGR control means 53*g*. Moreover, by increasing the amount of the inner EGR gas by driving the variable valve mechanism 42 by the variable valve control means 53*f* in addition to the reduction of the amount of the outer EGR gas, it is possible to enhance the vaporization of the fuel spray and increase the selection range of ignitable ADV, and therefore the combustion stability can be recovered ever faster.

Figure 24:
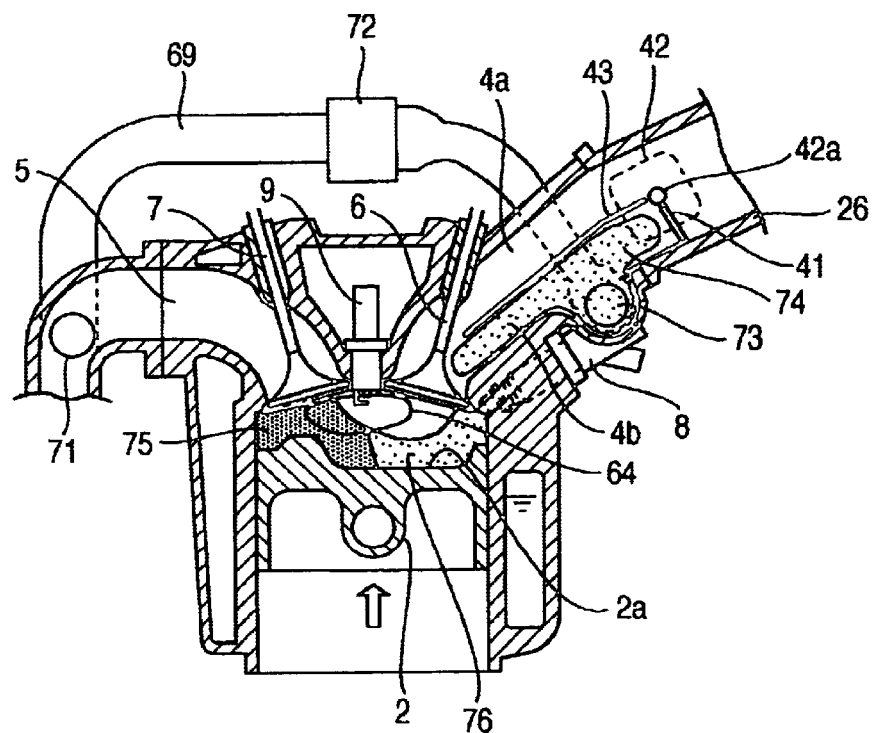
FIG. 24 is a schematic view showing a state just before ignition by the EGR control means and the variable valve train control means in FIG. 21.

FIG. 24 shows a state just before an ignition during compression stroke.

The fuel spray, which is injected slightly earlier than the above state at a crankshaft angle of 60 degrees before the compressive top dead center (TDC), is mixed with the intake air promoted by the stream of the tumble flow 68 preserved till the compression stroke and rise of temperature in the cylinder 1 due to the inner EGR gas 75 introduced into the cylinder 1, thereby forming an ignitable air/fuel mixture 64.

Since the outer EGR gas 76 taken into the cylinder 1 during intake stroke, is distributed densely on an intake valve side of the crown surface of the piston 2*a* as the piston 2 moves upward during compression stroke, and the inner EGR gas 75 and the outer EGR gas 76 are distributed on a piston side, the distribution of the air/fuel mixture will be concentrated in a relative small area around the spark plug 9.

Therefore, the air/fuel mixture becomes an inseparable condition and thus the selection period of ADV is increased thereby enabling the selection of ADV for stable combustion.

Figure 25:
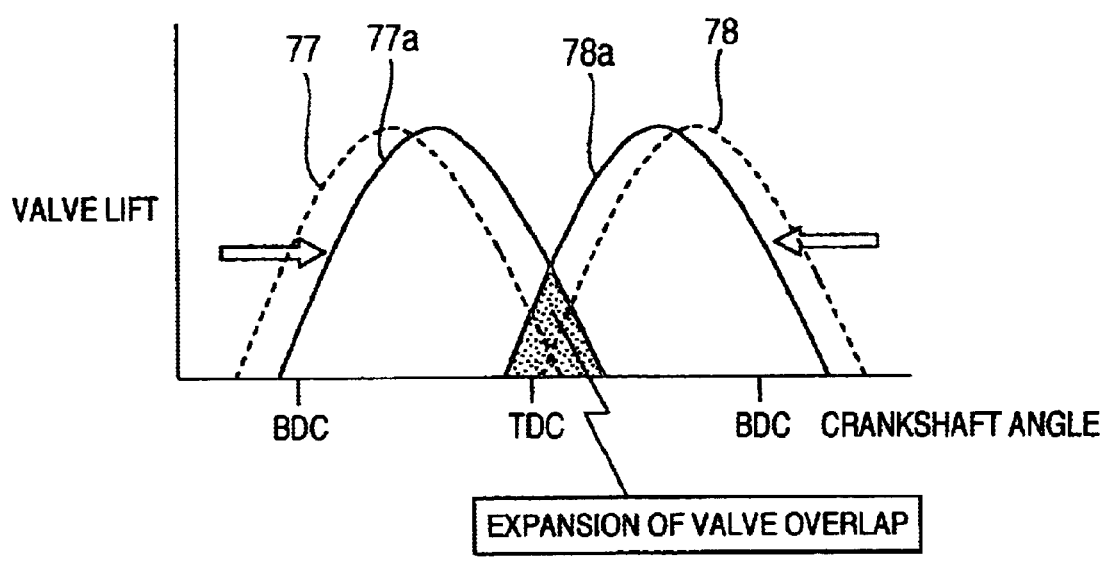
FIG. 25 is a valve timing chart by the variable valve train control of FIG. 21.

FIG. 25 is a valve timing chart in the case of introducing the inner EGR gas into the cylinder 1.

In an operation state in which the inner EGR gas, which is a burnt gas, is not positively introduced into the cylinder 1, closing timing of the exhaust valve 7 is denoted by 77, and opening timing of the intake valve 6 is denoted by 78.

On one hand, when the combustion is deteriorated due to deposit of droplets, since it is necessary to introduce the inner EGR gas into the cylinder 1 to recover the combustion stability, the valve overlap is increased by retarding the closing timing of the exhaust valve 7 to 77*a* and advancing the opening timing of the intake valve 6 to 78*a*.

In the present embodiment, although both the timings of the exhaust valve 7 and the intake valve 6 are changed, either of them may be changed separately. Thus, the EGR control means 53*g* and the variable valve control means 53*f* are effective in recovering the combustion stability even when they are operated separately. Also, they may be performed in combination with other control parameters.

Next, the supercharging control means 53*h* of the parameter trial operation means 53 will be described referring to FIG. 2.

As shown in FIG. 2, the configuration of the exhaust system is such that the exhaust manifold 29 is connected to the exhaust pipe 31 through the turbine 30 of the turbocharger which is a supercharger, and is also connected to the exhaust pipe 31 via the bypass valve 32.

As described so far, in a supercharged direct injection engine, the in-cylinder pressure rises higher during compression stroke compared to the case of a natural aspiration engine. The high in-cylinder pressure makes the fuel spray tend to shrink, which is disadvantageous in facilitating the vaporization of the center portion of the fuel spray. For this reason, during operating with a high degree of supercharging, because insufficiently vaporized mixed fuel spray passes through the spark plug, the frequency of misfire will increase due to the wetting of the spark plug.

Accordingly, when the fluctuation of rotation exceeds a predetermined threshold and thereby deterioration of combustion in a high pressure supercharged operation is detected, the supercharge pressure control means 53*h* drives the bypass valve 32 thereby decreasing the exhaust gas passing through the turbine 30 so as to control the supercharging pressure of the supercharger not to exceed or to decrease to a predetermined value.

Regarding a supercharged direct injection engine, any method to enhance the vaporization of the fuel spray in the pressurized cylinder 1 by limiting the supercharging pressure when deterioration of combustion is detected, can be combined with the above described method of changing the control parameters. When the combustion stability is recovered, the supercharging pressure is regained by closing the bypass valves 32.

When performing catalyst early activation control to achieve early activation of the catalytic converter 33, a warming-up operation stabilized by the combustion stabilizing control by the combustion stabilizing means 40 may be continued.

Thus, in the catalyst early activation control, the injection mode is set to the intake stroke injection mode during the cranking at cold stating, and switched to the compression stroke injection mode after complete combustion. Then, the ignition is performed by setting the ADV to the compression top dead center (TDC) as close as possible within a range in which combustion stability is maintained. Moreover, the variable valve control mechanism is driven to advance the timing of opening the exhaust valve 7 by a maximum amount within the limit of control.

Since an amount of the unburned fuel (HC) has been increased in the inner EGR gas as described so far, performing second ignition during exhaust stroke causes an after burning by flame propagation from the combustion chamber 3 for a short period of time in the exhaust manifold 29 thus making it possible to raise the temperature of the exhaust gas.

Also upon cold starting, the target amount of the fuel injection is incrementally modified to the idling state after the warming-up by the fuel injection program as in the case of conventional engines, and the incremental modification is terminated under sufficiently warmed-up state and at the completion of the catalyst early activation control.

Therefore, by performing the combustion stabilizing control upon cold starting and by using the variable valve control means 53*f* and the ignition timing control means 53*b*, it is possible to achieve early activation of the catalytic converter 33 while maintaining the combustion stability.

Moreover, when performing the early catalyst activation control, the exhaust gas may be flown into the exhaust pipe 31 bypassing the turbine 30 by opening the bypass valve 32. Thereby, it is possible to reduce thermal energy absorbed in the turbine 30 and increase thermal energy supplied to the catalytic converter 33. Also, the above described catalyst early activation control is terminated when the temperature measured by the exhaust temperature sensor 35 provided in the exhaust pipe 31 exceeds a predetermined value so as to prevent thermal degradation of the catalytic converter 33 due to an excessive temperature rise. Furthermore, the catalyst early activation control may be terminated when a predetermined time elapses from a cold start without providing the exhaust temperature sensor.

Figure 26:
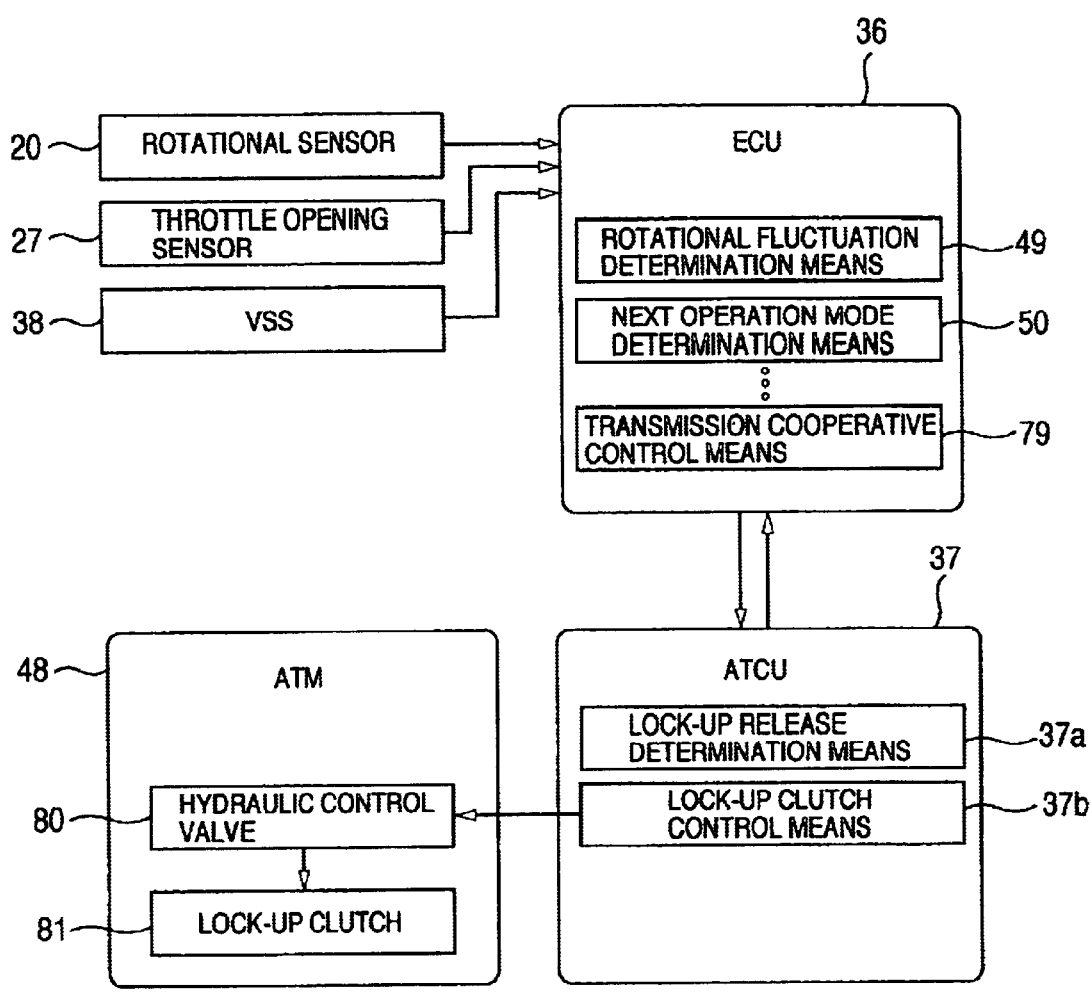
FIG. 26 is a block diagram showing communication links of the ECU and the ATCU in the combustion stabilizing control by the combustion stabilizing means of FIG. 3.
Figure 27:
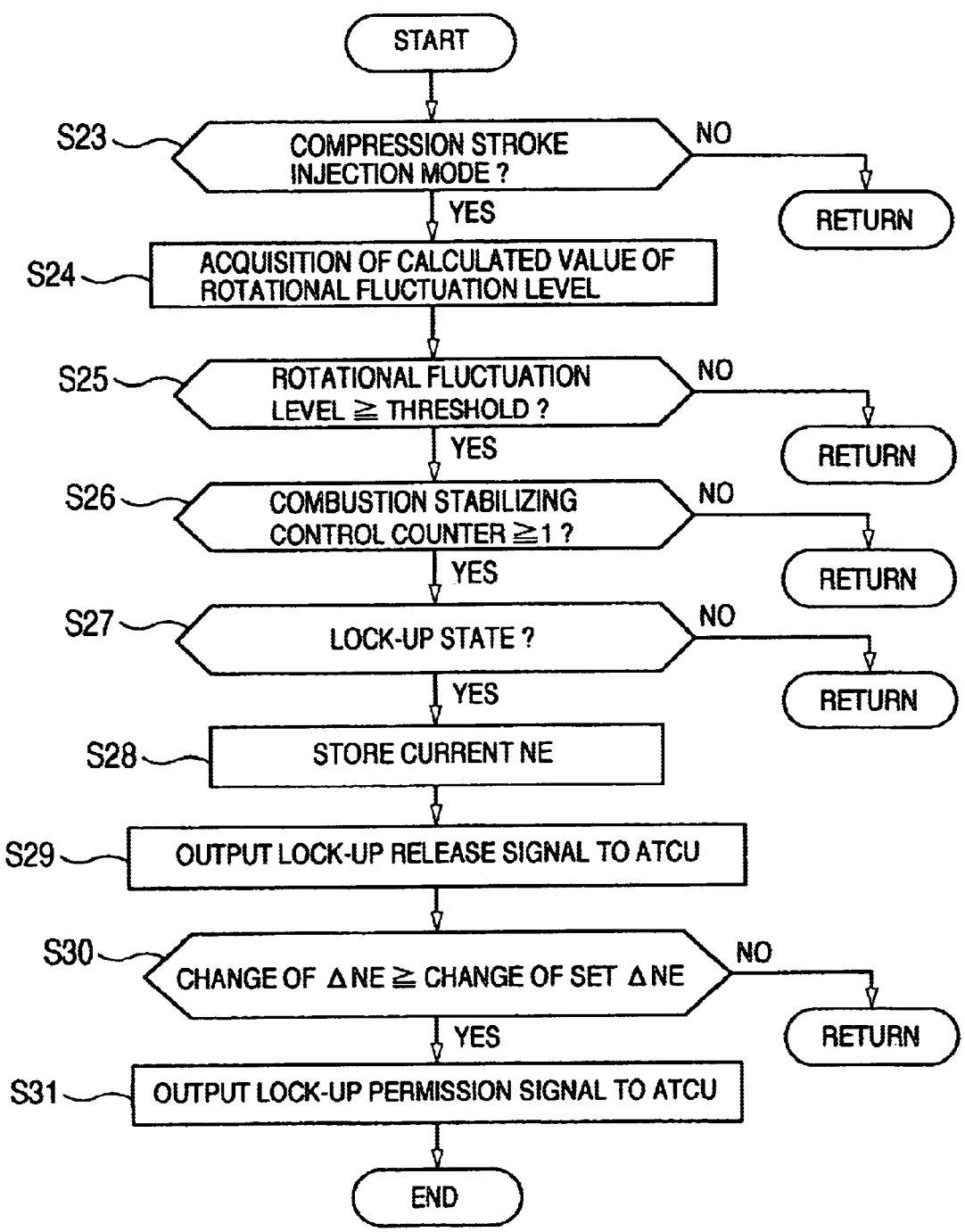
FIG. 27 is an operational flow chart of the transmission cooperative control means of FIG. 26.

Next, FIGS. 26 and 27 relate to the transmission cooperative control means 79 of the combustion stabilizing means 40.

FIG. 26 shows a communication control system between the ECU 36 and the ATCU 37.

As described above, the ECU 36 comprises the transmission cooperative control means 79 and acquires the information to be used for cooperative control of the engine with the ATM 48 as output signals from various sensors such as the rotational speed sensor 20, the throttle sensor 27, and the vehicle speed sensor 38.

On one hand, the ACTU 37 comprises lock-up release determination means 37*a* and lock-up clutch control means 37*b*, and performing an optimal shift control according to the engine conditions by always communicating with the ECU 36 mutually.

In the transmission cooperative control means 79, when fluctuation of rotation which relates to combustion stability exceeds a threshold and thus deterioration of combustion of the engine is detected, the ECU 36 outputs a control signal to ATCU 37 to drive power transmission mechanisms such as ATM hydraulic control valve 80 so that the ATM 48 controls the lock-up clutch 81. Specifically, when the fluctuation of rotation exceeds a threshold, the lock-up of ATM 48 is released, and when the fluctuation of rotation becomes low than a predetermined threshold after the release of the above described lock-up at a substantially same rotational speed of the engine relating to the acceleration/deceleration at the timing of the release of the lock-up, the above described lock-up is performed again.

FIG. 27 is an operational flow chart of the transmission cooperative control means 79.

In step 23, a determination is made as to whether or not the injection mode is the compression stroke injection mode. In step 24, the level of fluctuation of rotation is calculated. In step 25, the level of fluctuation of rotation is compared with a predetermined threshold by the rotational fluctuation determination means 49.

In step 26, whether of not the combustion stabilizing control has been conducted up to the present is determined with reference to storage content of the operational mode history storage means 54. When the combustion stabilizing control has been executed, namely, when the answer is 'YES,' the process proceeds to step 27. The other hand, when the combustion stabilizing control has not been executed, the process exits the routine.

In step 27, whether or not the ATM 37 is in a lock-up state is determined by the transmission cooperative control means 79 and the process proceeds to step 28. In step 28, the rotational speed of the engine at present is stored and the process proceeds to step 29. In step 29, the lock-up release signal is output to ATCU 37, and the process proceeds to step 30.

In step 30, a determination is made as to whether the engine rotational speed change ΔNe becomes a set engine rotational speed change ΔNe and less which is a predetermined threshold. When the engine rotational speed change ΔNe is the set engine rotational speed change ΔNe and less, the process proceeds to step 31 to output lock-up allowing signal to ATCU 37. On the other hand, when the engine rotational speed change ΔNe exceeds the set engine rotational speed change ΔNe, the process exits the routine.

Thus, when the combustion is deteriorated, the transmission of a torque change from the engine to the vehicle drive train is mitigated for the lock-up state by the automatic transmission mechanism. In other words, by backing up with the control of the automatic transmission, it is at least possible to improve the drive feel, even though it is impossible to directly solve the problem of combustion deterioration.

Moreover, although the above described set engine rotational speed change ΔNe in the present embodiment is set to about 500 r/min, it is not limited to this set rotational speed, but an optimal set engine rotational speed change ΔNe may be selected depending on the matching between the transmission and the engine. Also, the set engine rotational speed change ΔNe may be changed for each shift of the automatic transmission.

As so far described, the above described embodiments of the present invention have following functions owing to the above described configuration.

That is, the control apparatus 36 for a direct injection engine according to the present embodiments in which the injection by the fuel injection valve 8 is performed during intake stroke to achieve homogenous combustion, during compression stroke to achieve stratified combustion, and during exhaust stroke for raising the catalyst temperature, comprises combustion stabilizing means 40 for stabilizing the combustion in the cylinder 1. The combustion stabilizing means 40 comprises next operation mode determination means. The next operation mode determination means can select either one of the following operational modes when a deteriorated state of combustion in the operation mode of the compression stroke fuel injection is detected based on the fluctuation of rotation of the engine. One mode is for recovering the combustion stability by the intake stroke fuel injection mode by prohibiting the switching to the operation mode for recovering the combustion stability by the compression stroke fuel injection. The other mode is for recovering the combustion stability by changing various control parameters relating to the combustion in the compression fuel injection mode. Therefore, the operation mode is not switched to the fuel injection during intake stroke all the time as is the case with prior arts, and it is possible to set the operation range by the compression stroke fuel injection to a wider range compared to conventional methods thereby enhancing the advantage of the direct injection engines.

Moreover, with the above-described structure, the control apparatus 36 for a direct injection engine according to the present embodiment is also capable of setting a priority in control such that after recovering the combustion stability in the intake stroke injection mode within a limited time prior to the compression stroke injection mode, the control parameters are changed in the compression stroke injection mode. Therefore, it is possible to achieve a rapid combustion stability and enhance the reliability of the engine without repeating unnecessary recovering operations of the combustion stability.

Furthermore, in comparison with the case in which combustion stability is recovered only by changing control parameters in the compression stroke injection mode, it is possible to appropriately cope with the deterioration of combustion due to the buildup of deposits in early stages, and in comparison with the case in which the recovering of combustion stability is performed only by the intake stroke injection mode, it is possible to cope with the deterioration of drive feel due to torque steps.

So far one embodiment of the present invention has been described in detail, but the present invention will not be limited to the above described embodiment and various variations in design can be made without departing from the scope described in appended claims.

For example, in the above described embodiment, the combustion stabilizing means 40 is configured to recover the combustion stability by the compression stroke injection mode after the intake stroke injection mode as shown in FIG. 4. However, the combustion stabilizing means is not limited to this configuration. The configuration may be such that, as far as the next operation mode determination means 50 can select any mode, recovery by the compression stroke injection mode is performed together with the intake stroke injection mode, or recovery of combustion stability by the compression stroke injection mode is performed independent of the intake stroke injection mode. In all these cases, the advantages described above will be equally achieved. For example, each control parameter such as fuel pressure, exhaust gas recirculation amount, airflow generation valve opening degree, valve overlap between the intake/exhaust valves, the number of fuel injection is chosen to accelerate the mixing of air and fuel by making the control parameters affecting the mixing of air and fuel variable to recover the combustion stability. However, these parameters are relatively low sensitivity against the combustion stability, and therefore, it is possible to continue the intake stroke injection mode for a predetermined time period while changing the parameters.

On the other hand, each control parameter of the above described fuel injection timing, target injection amount, and ignition timing has higher sensitivity in affecting the combustion stability, and therefore the intake stroke injection mode will not be performed, but only the change of the above parameters will be performed.

Moreover, in the transmission cooperative control means 79, the determination is made, as in step 30, based on the change width of the rotational speed ΔNe, but other than this examples, the determination may be based on the variation of the vehicle speed or the throttle opening.

As will be understood from the above description, the control apparatus for direct injection engine according to the present invention is capable of preventing the deterioration of combustion during compression stoke of the engine, enhancing the drive feel, and substantially improving the fuel consumption rate through the expansion of operating range by the compression stroke fuel injection.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A control apparatus for a direct injection engine having an intake valve, an exhaust valve and a fuel injection valve for injecting fuel directly into a cylinder of the engine and in which fuel injection by said fuel injection valve is performed during intake stroke or during compression stroke of the engine, wherein said control apparatus comprises combustion stabilizing means for stabilizing combustion in said cylinder, said combustion stabilizing means comprising next operation mode determination means for selecting either an operation mode of recovering the combustion stability by fuel injection during intake stroke or an operation mode of recovering the combustion stability by fuel injection during compression stroke when a deteriorated state of combustion is detected in fuel injection during compression stroke.

2. The control apparatus for a direct injection engine according to claim 1, wherein said combustion stabilizing means includes intake stroke injection continuation means for continuing the fuel injection during intake stroke for a predetermined time period when recovering the combustion stability by the fuel injection during intake stroke.

3. The control apparatus for a direct injection engine according to claim 1, wherein said combustion stabilizing means includes control parameter change means for changing control parameters relating to combustion when recovering the combustion stability by fuel injection during compression stroke.

4. The control apparatus for a direct injection engine according to claim 3, wherein said control parameter comprises at least one of fuel pressure, a recirculation amount of an exhaust gas, an opening degree of an airflow generation valve, valve overlaps between the intake/exhaust valves, and number of fuel injections.

5. The control apparatus for a direct injection engine according to claim 1, wherein said next operation mode determination means selects an operation mode for recovering the combustion stability by fuel injection during intake stroke depending on frequency of detection of deteriorated states of combustion in fuel injection during compression stroke or operation requirements of said engine.

6. The control apparatus for a direct injection engine according to claim 1, wherein said next operation mode determination means prohibits switching to an operation mode for recovering the combustion stability by fuel injection during compression stroke when recovering the combustion stability by fuel injection during intake stroke, and selects an operation mode of recovering the combustion stability by fuel injection during compression stroke when continuation of the operation mode of recovering combustion stability by fuel injection during intake stroke is performed a predetermined number of times.

7. The control apparatus for a direct injection engine according to claim 6, wherein said combustion stabilizing control means comprises control parameter change means for changing control parameters relating to combustion when recovering combustion stability by fuel injection during compression stroke, and said control parameters comprise at least one of fuel injection timing of said fuel injection valve, a target amount of fuel injection, and ignition timing.

8. The control apparatus for a direct injection engine according to claim 7, wherein the control parameters of said fuel injection timing and said ignition timing are alternately changed.

9. The control apparatus for a direct injection engine according to claim 8, wherein the control parameters of said fuel injection timing and said ignition timing are changed either in advancing direction or in retarding direction at each of said fuel injection timing and said ignition timing so that said fuel injection timing and said ignition timing make substantially same variation of a crankshaft angle with respect to a reference crankshaft angle, in which said fuel injection timing and said ignition timing make same crankshaft angle.

10. The control apparatus for a direct injection engine according to claim 3, wherein said combustion stabilizing means includes control parameter reset means for, when a deteriorated state of combustion during fuel injection of compression stroke is improved, resetting said control parameters to values at the time of improvement and storing said reset values until next deteriorated state of combustion in fuel injection during compression stroke is detected.

11. The control apparatus for a direct injection engine according to claim 4, wherein said combustion stabilizing means includes control parameter reset means for, when a deteriorated state of combustion during fuel injection of compression stroke is improved, resetting said control parameters to values at the time of improvement and storing said reset values until next deteriorated state of combustion in fuel injection during compression stroke is detected.

12. The control apparatus for a direct injection engine according to claim 7, wherein said combustion stabilizing means includes control parameter reset means for, when a deteriorated state of combustion during fuel injection of compression stroke is improved, resetting said control parameters to values at the time of improvement and storing said reset values until next deteriorated state of combustion in fuel injection during compression stroke is detected.

13. The control apparatus for a direct injection engine according to claim 8, wherein said combustion stabilizing means includes control parameter reset means for, when a deteriorated state of combustion during fuel injection of compression stroke is improved, resetting said control parameters to values at the time of improvement and storing said reset values until next deteriorated state of combustion in fuel injection during compression stroke is detected.

14. The control apparatus for a direct injection engine according to claim 9, wherein said combustion stabilizing means includes control parameter reset means for, when a deteriorated state of combustion during fuel injection of compression stroke is improved, resetting said control parameters to values at the time of improvement and storing said reset values until next deteriorated state of combustion in fuel injection during compression stroke is detected.

15. The control apparatus for a direct injection engine according to claim 1, wherein said combustion stabilizing means includes rotational fluctuation determination means for determining combustion state on basis of fluctuation of rotation of said engine.

16. The control apparatus for a direct injection engine according to claim 1, wherein said control apparatus has an operation region of fuel injection during compression stroke as a control map based on the rotational speed and load of said engine, or as a control map based on the rotational speed and water temperature of said engine, and said combustion stabilizing means changes a region of said control map, in which said threshold is surpassed, from an operation region by fuel injection during compression stroke to an operation region by fuel injection during intake stroke when the fluctuation of rotation of said engine exceeds a predetermined threshold.

17. The control apparatus for a direct injection engine according to claim 1, wherein said engine includes a supercharger and said combustion stabilizing means prevents supercharge pressure of said supercharger from exceeding a predetermined value or decrease the supercharge pressure of said supercharger when the fluctuation of rotation of said engine exceeds a predetermined threshold.

18. The control apparatus for a direct injection engine according to claim 1, wherein said engine includes an inner EGR mechanism for introducing burnt gas into said cylinder by changing the overlap amount of the intake and exhaust valves and an outer EGR mechanism for introducing the burnt gas into an intake port from other piping passage, and said combustion stabilizing means decreases said outer EGR amount and/or increases said inner EGR amount when the fluctuation of rotation of said engine exceeds a predetermined threshold.

19. The control apparatus for a direct injection engine according to claim 1, wherein said engine is combined with an automatic transmission, and said combustion stabilizing means includes transmission cooperative control means for releasing lock-up of said transmission when the fluctuation of rotation of said engine exceeds a predetermined threshold, and effecting the lock-up again when the fluctuation of rotation of said engine becomes lower than the predetermined threshold in a substantially equal rotational speed range to that of the moment of releasing the lock-up.

20. A control apparatus for a direct injection engine, comprising:

an electric control unit for controlling operating parameters of said engine;

combustion stabilizing means, contained in said electronic control unit, said combustion stabilizing means being operable in response to a detection of a deteriorated combustion state of said engine, for alternatively and selectively causing said engine to operate in one of two recovery modes for restoring combustion stability, including a first recovery mode for restoring combustion stability while operating said engine with fuel injection during the intake stroke, and a second recovery mode for restoring combustion stability while operating said engine with fuel injection during the compression stoke, with operating parameters of said engine in said second recovery mode being adjusted to values that differ from corresponding operating parameter values in said first recovery mode;

next operation mode determining means contained in said combustion stabilizing means and responsive to said detection of a deteriorated combustion state of said engine, for selecting either said first recovery mode or said second recovery mode depending on operating conditions of the engine, stable engine operation being restored in either of said first or said second recovery mode.

* * * * *